(12) United States Patent
Makisumi

(10) Patent No.: US 11,951,613 B2
(45) Date of Patent: Apr. 9, 2024

(54) ROTATION MECHANISM AND ROBOT

(71) Applicant: Nabtesco Corporation, Tokyo (JP)

(72) Inventor: Kazuyoshi Makisumi, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/182,793

(22) Filed: Mar. 13, 2023

(65) Prior Publication Data

US 2023/0302666 A1  Sep. 28, 2023

(30) Foreign Application Priority Data

Mar. 23, 2022  (JP) ................................ 2022-046750

(51) Int. Cl.
  *B25J 17/02*  (2006.01)
  *B25J 9/00*  (2006.01)
  *B25J 9/10*  (2006.01)

(52) U.S. Cl.
  CPC ......... *B25J 17/0233* (2013.01); *B25J 9/0015* (2013.01); *B25J 9/102* (2013.01); *B25J 17/0241* (2013.01)

(58) Field of Classification Search
  CPC ......... F16H 2001/327; F16H 2001/323; F16H 57/08; F16H 2001/325; B25J 9/102; B25J 17/0241
  See application file for complete search history.

(56) References Cited

U.S. PATENT DOCUMENTS

| 7,566,186 | B2 | 7/2009 | Katz et al. | |
| 9,490,679 | B2* | 11/2016 | Yamamoto | ............... B60K 1/00 |
| 10,458,519 | B2* | 10/2019 | Guttenberger | ........ F16H 57/023 |
| 2018/0111275 | A1* | 4/2018 | Kurek | ...................... B25J 19/02 |
| 2020/0025277 | A1 | 1/2020 | Tamura et al. | |
| 2021/0291385 | A1* | 9/2021 | Mathews | ................. A63H 3/46 |
| 2022/0023767 | A1 | 1/2022 | Gaba et al. | |

FOREIGN PATENT DOCUMENTS

JP  2011-020214 A  2/2011
WO  WO-2021012199 A1 *  1/2021  .............. B25J 17/00

OTHER PUBLICATIONS

Extended European Search Report dated Aug. 14, 2023, issued in corresponding European Patent Application No. 23161194.8 (9 pgs.).

* cited by examiner

*Primary Examiner* — Gregory Robert Weber
(74) *Attorney, Agent, or Firm* — Pillsbury Winthrop Shaw Pittman, LLP

(57) ABSTRACT

A rotation mechanism according to the disclosure includes: an output portion for outputting, to a mating member, rotation of a drive source producing a rotational force; a coupling member for coupling the mating member and the output portion by elastic deformation; and an anti-rotation portion for preventing relative rotation between the mating member and the output portion.

10 Claims, 7 Drawing Sheets

ROTATION MECHANISM AND ROBOT

CROSS-REFERENCE TO RELATED APPLICATIONS

This application is based on and claims the benefit of priority from Japanese Patent Application Serial No. 2022-046750 (filed on Mar. 23, 2022), the contents of which are hereby incorporated by reference in their entirety.

TECHNICAL FIELD

The present disclosure relates to a rotation mechanism and a robot.

BACKGROUND

Cooperative robots are conventionally known as robots that share a work space with a worker. For example, a multi-joint cooperative robot, which is one of such cooperative robots, is provided with a speed reducing mechanism as well as an electric motor that serve as a rotation mechanism at a joint where two arms of the robot are connected to each other. The electric motor applies a rotational force to the speed reducing mechanism. In the multi-joint cooperative robot, the rotational force of the electric motor is decelerated and outputted by the speed reducing mechanism, such that a larger output torque can be applied from one of the two arms to the other. Japanese Patent Application Publication No. 2011-020214 ("the '214 Publication") discloses a technique related to a wrist swing axis of an industrial robot. In the '214 Publication, a speed reducer is attached to the frame by bolts.

For small-sized speed reducers, use of resin as a component material is being considered to further reduce the size and weight.

However, when the speed reducers are made of resin or the like for the purpose of reducing the size and weight, the assembly process at the connection between the speed reducer and the mating member using bolts may be complicated, considering the strength of the bolts and the mating member. Therefore, there was room for improvement in terms of simplifying assembly and disassembly work.

SUMMARY

The present disclosure provides a rotation mechanism and a robot for which assembly and disassembly work efficiency can be improved.

(1) A rotation mechanism according to one aspect of the disclosure comprises: an output portion for outputting, to a mating member, rotation of a drive source producing a rotational force around an axis; a coupling member for coupling the mating member and the output portion by elastic deformation; and an anti-rotation portion for preventing relative rotation between the mating member and the output portion.

This configuration does not need fastening by bolts or the like for assembly, making it possible to improve work efficiency in assembling and disassembling the output portion and the mating member.

(2) The coupling member may include: an elastic deformation portion extending in an axial direction along the axis and capable of elastic deformation in a radial direction intersecting the axial direction; and a claw portion provided at a distal end of the elastic deformation portion and projecting in the radial direction. In a state in which the coupling member couples the output portion and the mating member, the elastic deformation portion extends through a through portion formed in the mating member and extending along the axial direction, and the elastic deformation portion is in contact with an inner surface of the through portion.

(3) The coupling member and the output portion may be integrally formed of resin, (4) The coupling member may be a snap-fit structure.

(5) The rotation mechanism may comprise a case; at least one crankshaft provided in the case and configured to rotate by receiving the rotation of the drive source; and a carrier provided in the case and configured to decelerate rotation of the crankshaft. The case serves as the output portion, The carrier is fixed to a stationary member, The coupling member couples the case and the mating member.

(6) The rotation mechanism may comprise a case; at least one crankshaft provided in the case and configured to rotate by receiving the rotation of the drive source; and a carrier provided in the case and configured to decelerate rotation of the crankshaft. The case serves as the output portion, The carrier is fixed to a stationary member, The coupling member couples the case and the mating member. An outer periphery of the case is in contact with an inner surface of a through hole formed in the mating member and extending along the axis. The anti-rotation portion is provided between the outer periphery of the case and the inner surface of the through hole.

(7) An outer diameter of the case may decrease in an axial direction along the axis toward a direction in which the outer periphery of the case is fitted into the through hole. An inner diameter of the through hole decreases toward the direction in which the outer periphery of the case is fitted into the through hole.

(8) The rotation mechanism may comprise a case fixed to a stationary member; at least one crankshaft provided in the case and configured to rotate by receiving the rotation of the drive source; and a carrier provided in the case and configured to decelerate rotation of the crankshaft and output the decelerated rotation to the mating member. The carrier serves as the output portion. The coupling member is formed integrally with the carrier.

(9) A rotation mechanism according to another aspect of the disclosure comprises: a case; an internal gear provided in the case and having internal teeth; an oscillating gear having external teeth meshing with the internal teeth, the oscillating gear being configured to rotate oscillatorily; a crankshaft having an eccentric portion that rotatably supports the oscillating gear and configured to transmit a rotational force of a drive source around an axis to the oscillating gear; a carrier configured to receive the rotational force from the oscillating gear and serve as an output portion for output to a mating member; a coupling member for coupling the mating member and the output portion by elastic deformation; and an anti-rotation portion for preventing relative rotation between the mating member and the output portion. The coupling member and the output portion are integrally formed of resin, The coupling member includes: an elastic deformation portion extending in an axial direction along the axis and capable of elastic deformation in a radial direction intersecting the axial direction; and a claw portion provided at a distal end of the elastic deformation portion and projecting in the radial direction. In a state in which the coupling member couples the output portion and the mating member, the elastic deformation portion extends through a through portion formed in the mating member and extending along the axial direction, and the elastic deformation portion is in contact with an inner surface of the through portion.

This configuration does not need fastening by bolts or the like for assembly, making it possible to improve work efficiency in assembling and disassembling the output portion and the mating member.

(10) A rotation mechanism according to another aspect of the disclosure comprises: a case; an internal gear provided in the case and having internal teeth; an oscillating gear having external teeth meshing with the internal teeth, the oscillating gear being configured to rotate oscillatorily; a crankshaft having an eccentric portion that rotatably supports the oscillating gear and configured to transmit a rotational force of a drive source around an axis to the oscillating gear; a carrier configured to receive the rotational force from the oscillating gear; a coupling member formed of resin and configured to couple a mating member and an output portion for output to the mating member by elastic deformation; and an anti-rotation portion for preventing relative rotation between the mating member and the output portion. The carrier is fixed to a stationary member, The case serves as the output portion. The coupling member includes: an elastic deformation portion extending in an axial direction along the axis and capable of elastic deformation in a radial direction intersecting the axial direction; and a claw portion provided at a distal end of the elastic deformation portion and projecting in the radial direction. In a state in which the coupling member couples the output portion and the mating member, the elastic deformation portion extends through a through portion formed in the mating member and extending along the axial direction, and the elastic deformation portion is in contact with an inner surface of the through portion. An outer periphery of the case is in contact with an inner surface of a through hole formed in the mating member and extending along the axis. The anti-rotation portion is provided between the outer periphery of the case and the inner surface of the through hole.

This configuration does not need fastening by bolts or the like for assembly, making it possible to improve work efficiency in assembling and disassembling the output portion and the mating member.

(11) A robot according to another aspect of the disclosure comprises: a first member and a second member; and a rotation mechanism provided between the first member and the second member and configured to rotate the second member relative to the first member. The rotation mechanism includes: an output portion for outputting, to the second member, rotation of a drive source producing a rotational force; a coupling member for coupling the second member and the output portion by elastic deformation; and an anti-rotation portion for preventing relative rotation between the second member and the output portion.

This configuration does not need fastening by bolts or the like for assembly, making it possible to improve work efficiency in assembling and disassembling the output portion and the mating member.

The present disclosure improves assembly and disassembly work efficiency.

DESCRIPTION OF THE EMBODIMENTS

First Embodiment

Figure 1:
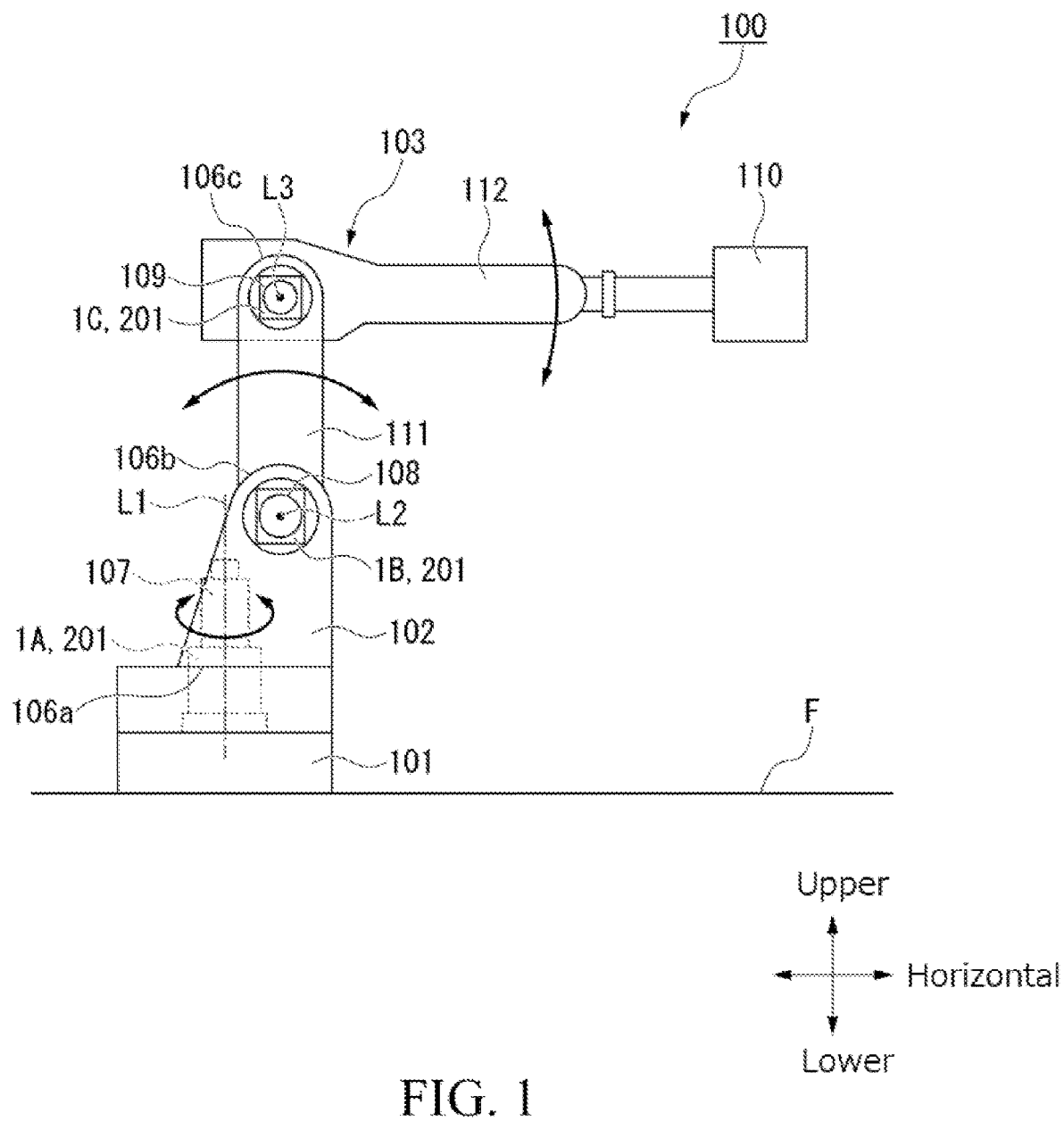
FIG. 1 is a schematic view showing an embodiment of a cooperative robot according to the disclosure.

The following describes a first embodiment of the disclosure with reference to the accompanying drawings. FIG. 1 schematically illustrates a cooperative robot according to the embodiment. In FIG. 1, the reference sign 100 denotes the cooperative robot. In the following description, the vertical and horizontal directions of the cooperative robot 100 are defined as the vertical and horizontal directions when the cooperative robot 100 is placed on an installation surface F.

As shown in FIG. 1, the cooperative robot 100 (robot) includes a base portion 101 (an example of a first member or a second member in the claims), a rotating head 102 (an example of the first member or the second member in the claims), an arm unit 103 (an example of the first member or the second member in the claims), speed reducing mechanisms 1A, 1B, and 1C (first speed reducing mechanism 1A, second speed reducing mechanism 1B, and third speed reducing mechanism 1C), servomotors 107, 108 and 109 (first servomotor 107, second servomotor 108, and third servomotor 109), and an end effector 110. The base portion 101 is placed on the installation surface F. The rotating head 102 is provided on the base portion 101. The arm unit 103 is rotatably assembled to the top of the rotating head 102. The speed reducing mechanisms 1A, 1B, and 1C are assembled to a joint portion 106a of the base portion 101, a joint portion 106b of the rotating head 102, and a joint portion 106c of the arm unit 103. The servomotors 107, 108, and 109 serve as drive sources. The end effector 110 is attached to the arm unit 103.

The rotating head 102 is coupled to the base portion 101 so as to be rotatable around a first rotation axis L1. The portion at which the base portion 101 is coupled to the rotating head 102 constitutes the first joint portion 106a. The first speed reducing mechanism 1A and the first servomotor 107 are assembled to the first joint portion 106a. The first rotation axis L1 coincides with, for example, the vertical direction. Rotation of the first servomotor 107 is transmitted to the rotating head 102 via the first speed reducing mechanism 1A. In this way, the rotating head 102 is rotationally driven relative to the base portion 101 around the first rotation axis L1.

The arm unit 103 includes, for example, two arms 111 and 112 (first arm 111 and second arm 112) each extending in one direction. A first end of the first arm 111 is coupled to the upper portion of the rotating head 102 so as to be rotatable about a second rotation axis L2. The portion at which the first end of the first arm 111 is coupled to the upper end of the rotating head 102 constitutes the second joint portion 106b. The second speed reducing mechanism 1B and the second servomotor 108 are assembled to the second joint portion 106b.

The second rotation axis L2 coincides with, for example, the horizontal direction. Rotation of the second servomotor 108 is transmitted to the first arm 111 via the second speed reducing mechanism 1B. In this way, the first arm 111 is rotationally driven relative to the rotating head 102 around the second rotation axis L2. The first arm 111 is driven to swing in the front and rear directions relative to the base portion 101.

A first end of the second arm 112 is coupled to a second end of the first arm 111 so as to be rotatable about a third rotation axis L3. The portion at which the first end of the second arm 112 is coupled to the second end of the first arm 111 constitutes the third joint portion 106c. The third speed reducing mechanism 1C and the third servomotor 109 are assembled to the third joint portion 106c. The third rotation axis L3 coincides with, for example, the horizontal direction. Rotation of the third servomotor 109 is transmitted to the second arm 112 via the third speed reducing mechanism 1C. In this way, the second arm 112 is rotationally driven relative to the first arm 111 about the third rotation axis L3. The second arm 112 is driven to swing in the upper and lower directions relative to the first arm 111.

The end effector 110 is attached to a second end of the second arm 112. By driving the rotating head 102, the first arm 111, and the second arm 112, the end effector 110 is three-dimensionally driven.

The base portion 101, rotating head 102, first arm 111, and second arm 112, which constitute the cooperative robot 100, are made of, for example, aluminum alloys or other materials, such as magnesium alloys, carbon fiber reinforced plastics (CFRP), resins containing boron nitride, or POM (polyacetal), PAEK (Polyaryletherketones) represented by PEEK (polyetheretherketone), or other resins.

Speed Reducing Mechanism

The speed reducing mechanisms 1A to 1C will be now described with reference to FIGS. 2 to 4. The basic configuration of the speed reducing mechanisms 1A to 1C is the same. Therefore, only the third speed reducing mechanism 1C will be hereunder described, and description of the first speed reducing mechanism 1A and the second speed reducing mechanism 1B will be omitted.

Figure 2:
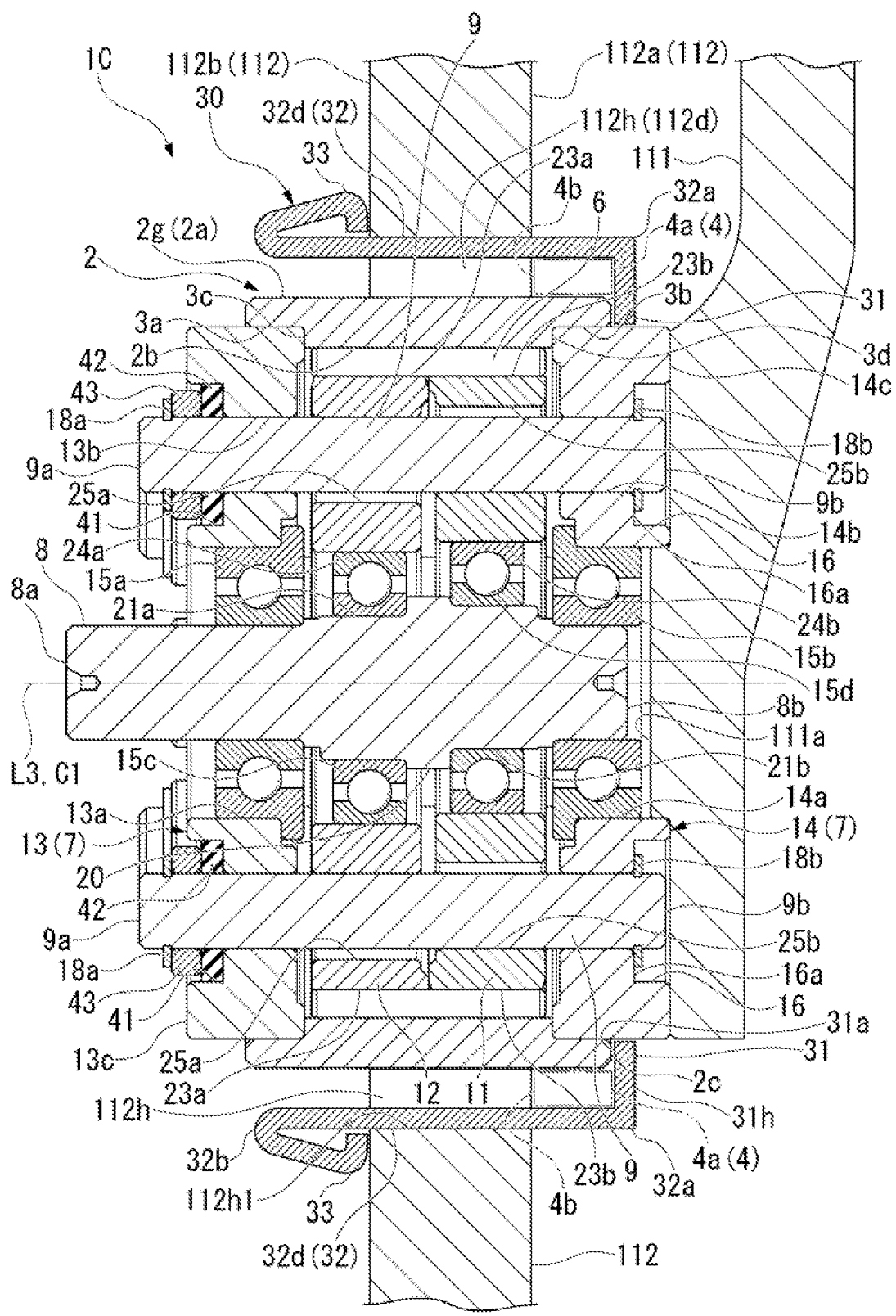
FIG. 2 is a schematic view showing a first embodiment of a rotation mechanism according to the disclosure.

FIG. 2 schematically illustrates the third speed reducing mechanism (rotation mechanism) 1C. As shown in FIG. 2, the third speed reducing mechanism 1C is what is called an eccentric oscillation speed reducing mechanism. The third speed reducing mechanism 1C includes a cylindrical case 2 (an example of an internal gear in the claims), a carrier 7 rotatably supported by the case 2, an input crankshaft (crankshaft) 8 rotatably supported by the carrier 7, a plurality of (for example, three) output shafts 9, and oscillating gears 11 and 12 (first oscillating gear 11 and second oscillating gear 12) rotatably supported by the input crankshaft 8.

A central axis C1 of the case 2 coincides with the third rotation axis L3. In the following description, the direction parallel to the third rotation axis L3 may be referred to as the axial direction, the circumferential direction around the third rotation axis L3 may be referred to as the circumferential direction, and the direction orthogonal to the axial direction may be referred to as the radial direction.

The case 2 is made of, for example, POM (polyacetal). The case 2 may be made of a resin different from POM, such as PAEK (Polyaryletherketones) represented by PEEK (polyetheretherketone). The resin may be, for example, PPS (Polyphenylene sulfide) or a resin containing PPS. In the embodiment, the case 2 may be made of, for example, an aluminum alloy, a magnesium alloy, carbon fiber reinforced plastic (CFRP), or a resin containing boron nitride as long as reduction of the size and weight is possible.

An outer flange portion 4 projecting outward in the radial direction is formed on the outer periphery 2a of the case 2. The outer flange portion 4 is located at an end of the case 2 in the axial direction and is formed integrally with the case 2. The outer flange portion 4 has, for example, a rectangular section along the axial direction. The outer flange portion 4 has end surfaces 4a and 4b (first end surface 4a, second end surface 4b) facing in the axial directions. The outer flange portion 4 is not provided on the entire circumference of the case 2 because of case cutting (working of the case 2), but is formed discontinuously in the circumferential direction of the case 2. Therefore, the outer flange portion 4 may be invisible in the sectional view shown in FIG. 2. Therefore, in FIG. 2, the outer flange portion 4 is drawn by a double-dashed line.

The second end surface 4b of the outer flange portion 4 receives the first surface 112a of the second arm (mating member) 112 applied to and contacted with the second end surface 4b. A coupling member 30 is fixed to and contacted with the first end surface 4a of the outer flange portion 4. The coupling member 30 is locked on the second arm 112 by a snap-fit structure. As a result, the outer flange portion 4 is sandwiched by the second arm 112 and the coupling member 30 in the axial direction. Thus, the case 2 fitted on the second arm 112 is fixed so that it does not move in the axial direction.

The inner peripheral surface 2b of the case 2 has a first large-diameter portion 3a and a second large-diameter portion 3b formed therein. The first large-diameter portion 3a is located in a first side of the case 2 (the end located on the rotating head 102 side) in the axial direction. The first large-diameter portion 3a and the inner peripheral surface 2b of the case 2 are connected via a first stepped portion 3c. The second large-diameter portion 3b is located at a second end of the case 2 in the axial direction. The second large-diameter portion 3b and the inner peripheral surface 2b of the case 2 are connected via a second stepped portion 3d. The inner diameters of the large-diameter portions 3a and 3b are larger than the inner diameter of the case 2. The large-diameter portions 3a and 3b receive the carrier 7.

A plurality of internal tooth pins 6 (an example of the internal gear in the claims) are provided on the inner peripheral surface 2b of the case 2 between the two stepped portions 3c and 3d. Each of the internal tooth pins 6 is formed of, for example, metal. However, this is not limitative. The internal tooth pins 6 may be made of, for example, a resin, non-metallic material or the like having a light weight. The internal tooth pins 6 may be made of a resin containing carbon nanotubes (CNT) or boron nitride nanotubes (BNNT). The internal tooth pins 6 may be made of ferrous metal such as bearing steel. The internal tooth pins 6 may be made of carbon fiber reinforced plastic (CFRP).

Each of the internal tooth pins 6 is shaped like a solid column. However, the internal tooth pins 6 are not necessarily solid but may be hollow. Each of the internal tooth pins 6 may be a multi-layered structure having a core material wrapped with a surface material. For example, one of the core and the surface material of the internal tooth pin 6 may be made of an iron-based metal, and the other may be made of a copper- or aluminum-based metal. Such a structure can combine good mechanical and density characteristics. As another example of the configuration of the internal tooth pin 6, one of the core and the surface material may be made of metal, and the other may be made of resin. The internal tooth pins 6 may be made of sintered metal.

The axial direction of the internal tooth pins 6 coincides with the central axis C1 of the case 2. The internal tooth pins 6 are arranged at regular intervals in the circumferential direction. The internal tooth pins 6 serve as internal teeth that mesh with the oscillating gears 11 and 12.

The carrier 7 includes a first carrier (shaft flange) 13 provided on the first large-diameter portion 3a situated closer to the rotating head 102, and a second carrier (hold flange) 14 provided on the second large-diameter portion 3b situated opposite to the first large-diameter portion 3a in the axial direction. Each of the carriers 13 and 14 is formed in a disc shape. The outer peripheral surfaces of the carriers 13 and 14 are slidably fitted to the large-diameter portions 3a and 3b, respectively. The carriers 13 and 14 are positioned relative to the case 2 in the axial direction by abutting against the corresponding stepped portions 3c and 3d.

The carriers 13 and 14 are made of resin, for example. The carriers 13 and 14 may be made of POM (polyacetal). Each of the carriers 13 and 14 may be formed of a resin different from POM, such as PAEK (Polyaryl Ether Ketones) represented by PEEK (Poly Ether Ether Ketone). The resin may be PPS (Poly Phenylene Sulfide) or a resin containing PPS. The carriers 13 and 14 may be made of carbon fiber reinforced plastic (CFRP).

The carriers 13 and 14 have input shaft holes 13a and 14a, respectively, formed at the center in the radial direction and extending through the carriers 13 and 14 in the axial direction. The input crankshaft 8 is inserted into the input shaft holes 13a and 14a. Bearings 15a and 15b (first bearing 15a and second bearing 15b) are provided in the input shaft holes 13a and 14a, respectively. The bearings 15a and 15b are ball bearings, for example. The input crankshaft 8 is rotatably supported by the carriers 13 and 14 via the bearings 15a and 15b. The rotation axis of the input crankshaft 8 coincides with the central axis C1 of the case 2 (third rotation axis L3).

In each of the carriers 13 and 14, a plurality of (for example, eight) output shaft holes (shaft insertion holes) 13b and 14b are formed at equal intervals in the circumferential direction around the input shaft holes 13a and 14a. Output shafts 9 are inserted into the output shaft holes 13b and 14b. Thus, eight output shafts 9 are arranged at regular intervals in the circumferential direction. In a surface 13c of the first carrier 13 facing away from the second carrier 14, there are formed shim receiving recesses 41 that are coaxial with the corresponding output shaft holes 13b. The shim receiving recesses 41 are open to the surface 13c and communicate with the corresponding output shaft holes 13b.

In each of the shim receiving recesses 41, an elastic shim 42 having an annular shape is received. The inner diameter of the elastic shim 42 is approximately the same as or slightly larger than the inner diameter of the output shaft hole 13b. The elastic shim 42 is made of rubber or the like and elastically deforms. The elastic shim 42 may be made of a material other than rubber, provided that it is made of an elastically deformable material. For example, the rubber may be replaced with a wave washer as the elastic shim 42.

A spacer 43 having an annular shape is disposed on the elastic shim 42. The inner diameter of the spacer 43 is approximately the same as or slightly larger than the inner diameter of the output shaft hole 13b. The elastic shim 42 and the spacer 43 are provided for positioning the output shaft 9 with respect to the carriers 13 and 14. The elastic shim 42 and the spacer 43 are not limited to the annular shape, but may have various shapes as long as they can absorb manufacturing errors of the case 2, the carriers 13 and 14, and the output shaft 9.

In a surface 14c of the second carrier 14 facing away from the first carrier 13, there are formed recesses 16 that are coaxial with the corresponding output shaft holes 14b. The recesses 16 are open in the surface 14c and communicate with the corresponding output shaft holes 14b. The recesses 16 may be filled with grease, for example. The output shaft 9 inserted in the output shaft holes 13b and 14b is made of, for example, aluminum alloy or ferrous metals such as stainless steel, carbon steel, or bearing steel.

A first end portion 9a of the output shaft 9 on the first carrier 13 side protrudes slightly outward beyond the surface 13c of the first carrier 13. The elastic shim 42 and the spacer 43 are attached to the first end portion 9a of the output shaft 9. A first retaining ring 18a is provided on the spacer 43 at the first end portion 9a of the output shaft 9. Axial movement of the output shaft 9 toward the second carrier 14 is restricted by the first retaining ring 18a abutting against the spacer 43.

A second end portion 9b of the output shaft 9 on the second carrier 14 side is positioned slightly inside the surface 14c of the second carrier 14. That is, the second end portion 9b of the output shaft 9 is received in the recess 16 of the second carrier 14. A second retaining ring 18b is provided on the second end portion 9b of the output shaft 9. The second retaining ring 18b is received in the recess 16. Axial movement of the output shaft 9 toward the first carrier 13 is restricted by the second retaining ring 18b abutting against a bottom surface 16a of the recess 16.

The elastic shim 42, the spacer 43, and the retaining rings 18a and 18b serve to position the output shaft 9 relative to the carriers 13 and 14. Among them, the elastic shim 42 and the spacer 43 serve to absorb manufacturing errors of the case 2, the carriers 13 and 14, and the output shaft 9 and adjust the position of the output shaft 9 relative to the carriers 13 and 14. Specifically, the thicknesses of the elastic shim 42 and the spacer 43 in the axial direction should be adjusted depending on the amount of play of the output shaft 9 in the axial direction relative to the carriers 13 and 14. This reduce the play of the output shaft 9 in the axial direction relative to the carriers 13 and 14. The play is a looseness that allows the output shaft 9 to move in the axial direction relative to the carriers 13 and 14, which is caused by manufacturing errors of the case 2, the carriers 13 and 14, and the output shaft 9.

The thickness of the elastic shim 42 in the axial direction is determined such that the elastic shim 42 is slightly compressed. Thus, the first carrier 13 is biased toward the second carrier 14 by an elastic restoring force of the elastic shim 42. This securely prevents the carriers 13 and 14 and the output shaft 9 from being loosened. Even if the play of the output shaft 9 in the axial direction relative to the carriers 13 and 14 increases due to aged deterioration or the like, this play can be absorbed by the elastic shim 42. In addition, by biasing the first carrier 13 toward the second carrier 14, preload can be applied to the bearings 15a and 15b disposed in the input shaft holes 13a and 14a, respectively.

Since the movement of the output shaft 9 in the axial direction relative to the carriers 13 and 14 is restricted, the movement of the carriers 13 and 14 in the axial direction is restricted. Thus, the carriers 13 and 14 are kept fitted to the corresponding large-diameter portions 3a and 3b of the case 2, respectively. Therefore, the carriers 13 and 14 and the output shafts 9 are integrated together. Each of the output shafts 9 is inserted into the output shaft holes 13b and 14b of the carriers 13 and 14. Therefore, the output shafts 9 are arranged around the input crankshaft 8. Similar to the output shafts 9, the input crankshaft 8 may be made of, for example, aluminum alloy, stainless steel or various ferrous metals.

A first end portion 8a of the input crankshaft 8 on the first carrier 13 side protrudes axially outward through the first bearing 15a. The third servomotor 109 (see FIG. 1) is coupled to the first end portion 8a. Therefore, the rotation of the third servomotor 109 is transmitted to the input crankshaft 8.

A second end 8b of the input crankshaft 8 on the second carrier 14 side is situated substantially flush with the end surface of the second bearing 15b that faces away from the first carrier 13. The input crankshaft 8 has a first eccentric portion 21a and a second eccentric portion 21b arranged in the axial direction between the bearings 15a and 15b. The input crankshaft 8 has a large-diameter portion 20 positioned between the eccentric portions 21a and 21b. The diameter of the large-diameter portion 20 is larger than those of the eccentric portions 21a and 21b.

The first eccentric portion 21a is situated on the first carrier 13 side of the second eccentric portion 21b. The second eccentric portion 21b is situated on the second carrier 14 side of the first eccentric portion 21a. Each of the eccentric portions 21a, 21b is provided eccentrically with respect to the third rotation axis L3. The eccentric portions 21a and 21b are out of phase with each other. For example, the eccentric portions 21a and 21b are out of phase with each other by 180°.

The first eccentric portion 21a carries a third bearing 15c. The second eccentric portion 21b carries a fourth bearing 15d. Similar to the first bearing 15a and the second bearing 15b, the bearings 15c and 15d are ball bearings, for example. The distance between the bearing 15c and the bearing 15d in the axial direction is regulated by abutment of the axial end surfaces of the bearings 15c and 15d against the large-diameter portion 20. The oscillating gears 11 and 12 (the first oscillating gear 11 and the second oscillating gear 12) are rotatably supported on the eccentric portions 21a and 21b via the bearings 15c and 15d, respectively.

The oscillating gears 11 and 12 are made of, for example, resin. For example, the oscillating gears 11 and 12 may be made of POM (polyacetal). Similarly to the material for the carriers 13 and 14 described above, various resins can be used for the oscillating gears 11 and 12.

The oscillating gears 11 and 12 are arranged at a prescribed distance from each other between the carriers 13 and 14. A first crankshaft insertion hole 24a is formed in the center of the first oscillating gear 11 in the radial direction to extend through the first oscillating gear 11 in the thickness direction (axial direction). The outer peripheral surface of the third bearing 15c is fitted to the first crankshaft insertion hole 24a. Thus, the first oscillating gear 11 is rotatably supported on the first eccentric portion 21a via the third bearing 15c. Rotation of the first eccentric portion 21a causes the first oscillating gear 11 to rotate oscillatorily. A second crankshaft insertion hole 24b is formed in the center of the second oscillating gear 12 in the radial direction to extend through the second oscillating gear 12 in the thickness direction (axial direction). The outer peripheral surface of the fourth bearing 15d is fitted to the second crankshaft insertion hole 24b. Thus, the second oscillating gear 12 is rotatably supported on the second eccentric portion 21b via the fourth bearing 15d. Rotation of the second eccentric portion 21b causes the second oscillating gear 12 to rotate oscillatorily.

The first oscillating gear 11 has external teeth 23a formed in the outer periphery thereof. The second oscillating gear 12 has external teeth 23b formed in the outer periphery thereof. The external teeth 23a and 23b are meshed with the internal tooth pins 6. The number of teeth for each of the external teeth 23a and 23b is smaller than the number of the internal tooth pins 6 by, for example, one. The first oscillating gear 11 has first output shaft insertion holes 25a located at positions corresponding to the output shafts 9 and receiving the output shafts 9 inserted therein. The second oscillating gear 12 has second output shaft insertion holes 25b located at positions corresponding to the output shafts 9 and receiving the output shafts 9 inserted therein. The inner diameters of the output shaft insertion holes 25a and 25b are large enough to allow the oscillatory rotation of the oscillating gears 11 and 12 with the output shaft 9 inserted in the output shaft insertion holes 25a and 25b.

In the third speed reducing mechanism 1C, the surface 14c of the second carrier 14 receives, for example, the first arm (stationary member) 111 applied thereto. The first arm 111 is fixed to the second carrier 14 with bolts (not shown). The first arm 111 has a projection 111a that projects toward the second carrier 14. The projection 111a is fitted into the input shaft hole 14a of the second carrier 14. This accomplishes positioning of the first arm 111 in the radial direction with respect to the second carrier 14. The projection 111a projects to such an extent that it faces the second bearing 15b and the second end portion 8b of the input crankshaft 8 with a minute gap therebetween.

Coupling Member

As mentioned above, the coupling member 30 has a snap-fit structure. The coupling member 30 is locked on the second arm 112 through a through hole 112d formed in the second arm 112. FIG. 3 is a schematic perspective view of the third speed reducing mechanism 1C and the second arm 112. FIG. 4 is a perspective view of the coupling member 30.

Figure 3:
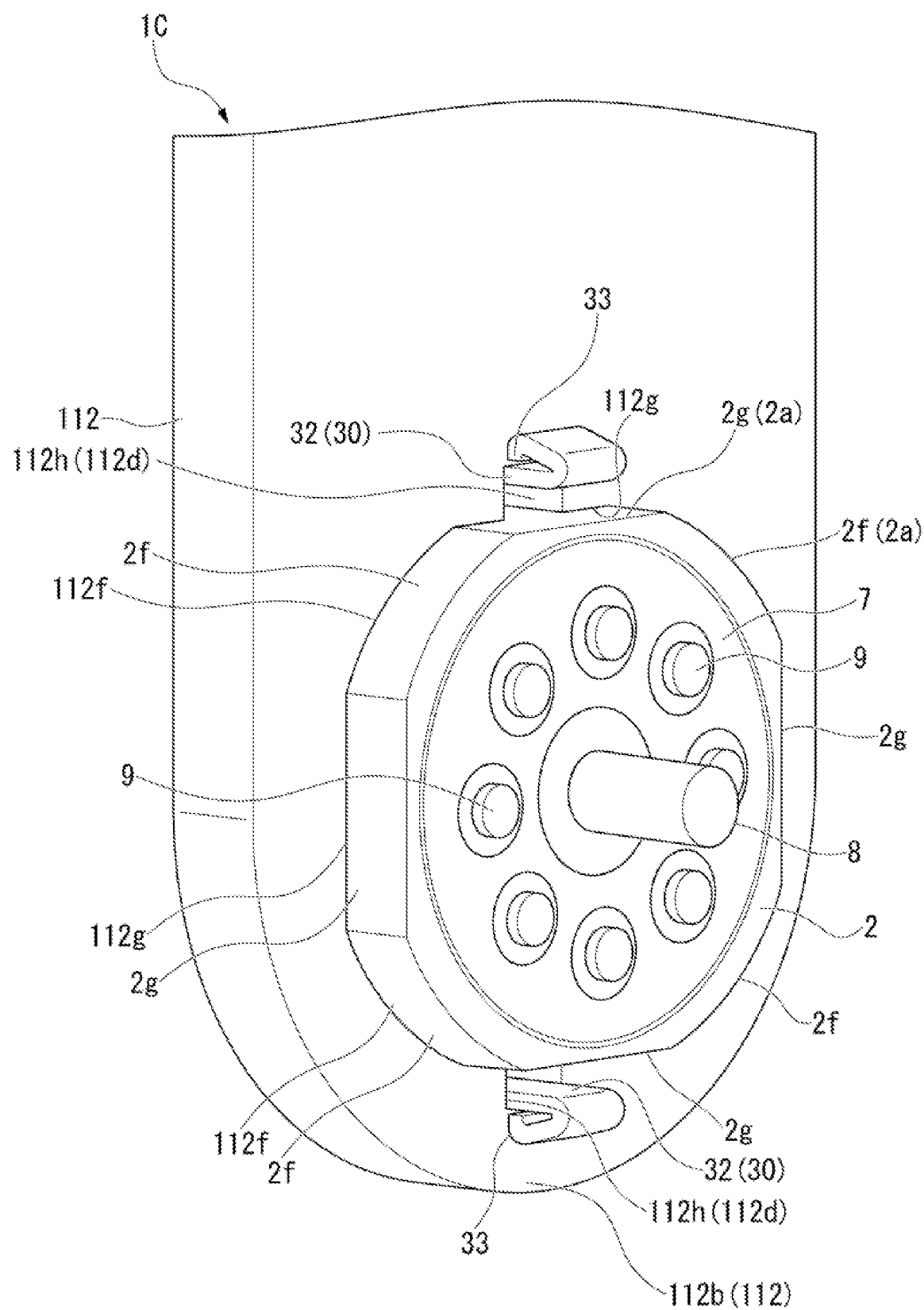
FIG. 3 is a schematic perspective view showing the first embodiment of the rotation mechanism according to the disclosure.
Figure 4:
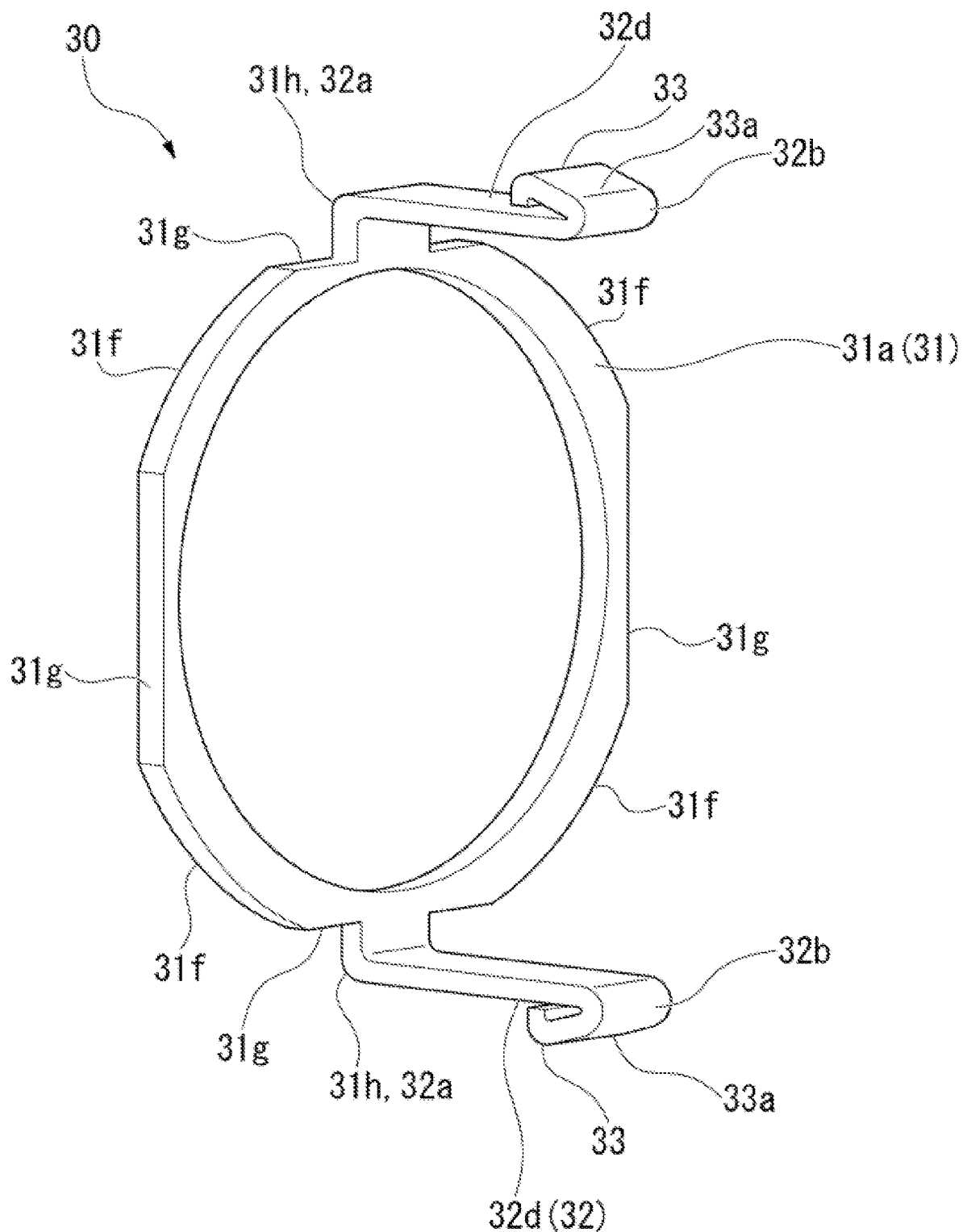
FIG. 4 is a perspective view showing a coupling member in the first embodiment of the rotation mechanism according to the disclosure.

As shown in FIGS. 3 and 4, the coupling member 30 includes a ring portion 31 that contacts with the first end surface 2c of the case 2 over the entire circumference, elastic deformation portions 32 that extend along the axial direction from the outer periphery of the ring portion 31, and claw portions 33 formed at the distal ends 32b of the elastic deformation portions 32. The coupling member 30 is formed of the same material as the case 2. The coupling member 30 is made of, for example, POM (polyacetal). The coupling member 30 may be made of a resin different from POM, such as PAEK (Polyaryletherketones) represented by PEEK (polyetheretherketone). The resin may be PPS (Poly Phenylene Sulfide) or a resin containing PPS. In the embodiment, the coupling member 30 may be made of, for example, an aluminum alloy, a magnesium alloy, carbon fiber reinforced plastic (CFRP), or a resin containing boron nitride as long as reduction of the size and weight is possible.

The surface of the ring portion 31 that faces in the direction in which the elastic deformation portions 32 extend is configured as a holding surface 31a. The holding surface 31a contacts with the first end surface 2c of the case 2 over the entire circumference. Further, the holding surface 31a contacts with the entire region of the first end surface 4a of the outer flange portion 4 in the axial direction. The inner periphery of the ring portion 31 is formed so that the outline of its cross section perpendicular to the axial direction is circular. The inner periphery of the ring portion 31 is separated from the carrier 7 (second carrier 14) by a predetermined distance in the radial direction over the entire circumference. The inner diameter of the ring portion 31 is larger than the diameter of the surface 14c of the second carrier 14.

In contrast, the outer periphery of the ring portion 31 has a noncircular outline. Specifically, the outer periphery of the ring portion 31 is constituted by a plurality of arc portions 31f and a plurality of flat portions 31g. Each of the plurality of arc portions 31f has an arc-shaped outline of its cross section perpendicular to the axial direction, and each of the plurality of flat portions 31g has a linear outline of its cross section perpendicular to the axial direction. The plurality of arc portions 31f and the plurality of flat portions 31g are arranged alternately in the circumferential direction so as to be adjacent to each other. In the embodiment, four flat portions 31g are formed separately in the circumferential direction. Any two of the four flat portions 31g facing each other in the radial direction across the central axis C1 are arranged parallel to each other. Further, any two of the four flat portions 31g adjacent to each other in the circumferential direction are perpendicular to each other. The flat portions 31g are located at the portions of the case 2 opened by case cutting.

Of the four flat portions 31g, each of a pair of flat portions 31g that are opposed to each other in the radial direction has an extension portion 31h that extends in the radial direction. The extension portions 31h are formed to project in opposite radial directions. The elastic deformation portions 32 are formed at the radially outer ends of the extension portions 31h.

Each of the elastic deformation portions 32 extends in the axial direction along the outer periphery of the case 2. The elastic deformation portion 32 is shaped like a plate having a predetermined width along the circumferential direction (circumferential width). The proximal end 32a of the elastic deformation portion 32 is connected to the extension portion 31h. The elastic deformation portion 32 extends from the first end surface 2c of the case 2 across the second surface 112b of the second arm 112. In other words, the proximal end 32a of the elastic deformation portion 32 is positioned closer to the first arm 111 than is the first end surface 2c in the axial direction. The distal end 32b of the elastic deformation portion 32 is positioned beyond the second surface 112b of the second arm 112. The elastic deformation portion 32 is formed of an elastic material that allows deformation in which the distal end 32b is slightly moved in the radial direction with the proximal end 32a serving as the base point.

At the distal end 32b of the elastic deformation portion 32, there is formed the claw portion 33 projecting radially outward. The circumferential width of the claw portion 33 is equal to the circumferential width of the elastic deformation portion 32. The claw portion 33 has a sloping surface 33a that is inclined to increase the thickness from the distal end 32b toward the proximal end. The claw portions 33 (and the elastic deformation portions 32) are formed at positions opposed to each other in the radial direction across the central axis C1. In this embodiment, the elastic deformation portion 32 shaped like a plate and having a predetermined thickness has an end portion that is bent twice to form the claw portion 33, but this is not limitative. The distance between the claw portions 33 in the radial direction is larger than the distance between two locking grooves 112h (described later) that are arranged symmetrically with respect to the central axis C1.

The coupling member 30 is placed from the second carrier 14 side onto the case 2 fitted into the through hole (through portion) 112d formed in the second arm 112, in such a manner that the ring portion 31 covers the first end surface 2c of the case 2. At this time, the arc portions 31f contact with the first end surface 4a of the outer flange portion 4. The outer flange portion 4 is formed by case cutting not to correspond to the flat portions 31g in the circumferential direction, but to correspond to the arc portions 31f in the circumferential direction.

The second arm 112 has the through hole 112d extending through the second arm 112 in the thickness direction of the second arm 112 (the axial direction). The case 2 is fitted into the through hole 112d of the second arm 112. The through hole 112d has approximately the same diameter and inner surface shape as the case 2 fitted therein. The through hole 112d is in contact with the outer periphery 2a of the case 2, except for the portions corresponding to the locking grooves (through portion) 112h (described later).

The inner diameter of the through hole 112d preferably decreases toward the direction in which the case 2 is inserted. Specifically, the inner diameter of the through hole 112d preferably gradually decreases along the axial direction from the first surface 112a toward the second surface 112b. In this embodiment, a tapered surface is formed on the inner side of the through hole 112d so as to approach the central axis C1 from the proximal end 32a toward the distal end 32b of the elastic deformation portion 32. The outer periphery 2a of the case 2 is also shaped in conformity to the tapered or other decreased diameter shape of the through hole 112d. This prevents looseness between the second arm 112 and the case 2.

Anti-Rotation Portion

The case 2 is fitted into the through hole 112d of the second arm 112. The inner periphery of the through hole 112d has a noncircular shape corresponding to the outer periphery of the ring portion 31. Accordingly, the inner periphery of the through hole 112d is constituted by four arc portions 112f and four flat portions 112g. Each of the four arc portions 112f has an arc-shaped outline of its cross section perpendicular to the axial direction, and each of the four flat portions 112g has a linear outline of its cross section perpendicular to the axial direction. Of the four flat portions 112g, each of a pair of flat portions 112g that are opposed to each other in the radial direction has a locking groove 112h that corresponds to the extension portion 31h and the elastic deformation portion 32. The coupling member 30 and the locking groove 112h of the second arm 112 constitute a coupling portion.

The outer periphery 2a of the case 2 has a surface shape corresponding to the through hole 112d of the second arm 112. Specifically, the outer periphery 2a of the case 2 has a noncircular shape corresponding to the outer periphery of the ring portion 31. The outer periphery 2a of the case 2 is constituted by four arc portions 2f and four flat portions 2g. Each of the four arc portions 2f has an arc-shaped outline of its cross section perpendicular to the axial direction, and each of the four flat portions 2g has a linear outline of its cross section perpendicular to the axial direction.

The case 2 is fitted into the through hole 112d of the second arm 112 so as to protrude inward in the radial direction. This prevents the case 2 from rotating in the circumferential direction relative to the through hole 112d. In other words, the flat portions 112g and 2g constitute an anti-rotation portion that prevents the case 2 from rotating in the circumferential direction relative to the through hole 112d.

Assembling Operation and Action of Coupling Portion

When setting up the coupling member 30, the elastic deformation portion 32 is inserted into the locking groove 112h from the second carrier 14 side toward the case 2 fitted into the through hole 112d of the second arm 112. The claw portion 33 abuts against the inner surface of the locking groove 112h, causing the elastic deformation portion 32 to elastically deform so that the distal end 32b moves radially inward with the proximal end 32a serving as the base point. As the elastic deformation portion 32 is inserted further into the locking groove 112h, the claw portion 33 passes through the locking groove 112h and reaches the outside of the locking groove 112h in the axial direction, beyond the second surface 112b of the second arm 112. Thus, the claw portion 33 detaches from the inner surface of the locking groove 112h, and the elastic deformation portion 32 is elastically deformed so that the distal end 32b moves radially outward with the proximal end 32a serving as the base point. At this time, a contact surface 32d of the elastic deformation portion 32 contacts with an inner surface 112h1 of the locking groove 112h.

As a result, the elastic deformation portion 32 is fixed to the locking groove 112h by the snap-fit structure using the elastic restorative deformation of the elastic deformation portion 32. On the second surface 112b of the second arm 112, the claw portion 33 abuts against the periphery of the through hole 112d. The coupling member 30 is thus retained to the second arm 112. Further, the holding surface 31a of the ring portion 31 abuts against the first end surface 2c of the case 2 and the first end surface 4a of the outer flange portion 4. Since the holding surface 31a of the ring portion 31 covers the first end surface 2c of the case 2 and the first end surface 4a of the outer flange portion 4, the case 2 is retained to the through hole 112d. On the first surface 112a of the second arm 112, the second end surface 4b of the outer flange portion 4 abuts against the periphery of the through hole 112d. The case 2 is thus retained to the through hole 112d. When setting up the coupling member 30, the coupling member 30 and the case 2 can be fitted together into the through hole 112d of the second arm 112.

Operation and Action of Speed Reducing Mechanism

Next, the operation and action of the third speed reducing mechanism 1C will be described. The third servomotor 109 shown in FIG. 1 is driven to rotate the input crankshaft 8 shown in FIG. 2. With the rotation of the crankshaft 8, the oscillating gears 11 and 12 rotatably supported by the eccentric portions 21a and 21b are oscillatorily rotated. A part of the external teeth 23a and 23b of the oscillating gears 11 and 12 then mesh with the internal tooth pins 6 of the case 2.

The number of teeth for each of the external teeth 23a and 23b is smaller than the number of the internal tooth pins 6 by, for example, one. Therefore, the meshing positions of the external teeth 23a and 23b with the internal tooth pins 6 (case 2) are shifted sequentially in the circumferential direction. Thus, the oscillating gears 11 and 12 rotate. The rotation of the oscillating gears 11 and 12 is at a lower speed than the rotation of the input crankshaft 8.

The output shafts 9 are inserted into the output shaft insertion holes 25a and 25b. When the oscillating gears 11 and 12 rotate, the rotational force of the oscillating gears 11 and 12 in the rotational direction is transmitted to the output shafts 9. Each of the output shaft 9 is rotatably supported by the carriers 13 and 14. Thus, the rotational force of the oscillating gears 11 and 12 is transmitted to the carriers 13 and 14.

The outer peripheral surfaces of the carriers 13 and 14 are slidably fitted to the large-diameter portions 3a and 3b of the case 2, respectively. Thus, each of the carriers 13 and 14 is rotated relative to the case 2. That is, the rotation of the third servomotor 109 is decelerated and outputted to the carrier 7 (the first carrier 13 and second carrier 14). The second arm 112 is fixed to the case 2. The first arm 111 is fixed to the second carrier 14. Thus, the first arm 111 is rotated around the third rotation axis L3 relative to the second arm 112.

For example, when the rotation of the first arm 111 (the second carrier 14) is restricted, the rotation of the third servomotor 109 is decelerated and outputted to the case 2. In this case, the second arm 112 is rotated relative to the first arm 111 about the third rotation axis L3. That is, the speed reducing mechanism 1C restricts the rotation of either the case 2 or the carrier 7, so that the other of the case 2 and the carrier 7 serves as the output for the servomotor 109. This operation principle also applies to the first speed reducing mechanism 1A and the second speed reducing mechanism 1B.

The output shaft 9 and the carriers 13 and 14 are integrated by inserting the output shaft 9 into the output shaft holes 13b and 14b. Thus, the output shaft 9 is freely rotated relative to the carriers 13 and 14. Moreover, by forming the carriers 13 and 14 of resin, the output shaft 9 can be rotatably supported by the carriers 13 and 14 without providing bearings separately from the carriers 13 and 14. The oscillating gears 11 and 12 are made of resin.

The output shaft 9 is smoothly brought into contact with the oscillating gears 11 and 12 without providing bearings separately from the oscillating gears 11 and 12. The PV limit of each carrier 13 and 14 and each oscillating gear 11 and 12 can be increased. Therefore, the speed reducing mechanisms 1A, 1B, and 1C can be stably operated, which extends the product life. Since it is not necessary to provide bearings for the contact between the carriers 13 and 14 and the output shaft 9 and between the oscillating gears 11 and 12 and the output shaft 9, the speed reducing mechanisms 1A, 1B and 1C can have a smaller size.

The output shaft 9 is inserted into the output shaft holes 13b and 14b of the carriers 13 and 14, respectively. Therefore, compared to the case where the output shaft 9 is press-fitted into the carriers 13 and 14 and fixed therein, the work efficiency in assembling and disassembling the speed reducing mechanisms 1A, 1B and 1C can be improved. The carriers 13 and 14 and the oscillating gears 11 and 12 are formed of resin, such that they can have a smaller weight. On the other hand, the output shaft 9 is formed of metal, and thus the rigidity of the output shaft 9 can be increased. Therefore, the speed reducing mechanisms 1A, 1B, and 1C can be operated more stably, and the product life can be extended.

In the eccentric oscillation speed reducing mechanisms (rotation mechanisms 1A, 1B, 1C), the carriers 13 and 14 having the output shaft holes 13b and 14b and the oscillating gears 11 and 12 having the output shaft insertion holes 25a and 25b are used as described above. As a result, the drive efficiency can be improved while downsizing the speed reducing mechanisms 1A, 1B, and 1C. Moreover, the PV limit of each carrier 13, 14 and each oscillating gear 11, 12 can be easily increased, and the rigidity of the output shaft 9 can also be increased. Therefore, the speed reducing mechanisms 1A, 1B, and 1C can be stably operated. The product life of the speed reducing mechanisms 1A, 1B, and 1C can be extended.

The elastic shim 42 and the spacer 43 are attached to the first end portion 9a of the output shaft 9. Therefore, positioning of the output shaft 9 relative to the carriers 13 and 14 can be performed easily and accurately. The elastic shim 42 and the spacer 43 can absorb manufacturing errors of the case 2, the carriers 13 and 14, and the output shaft 9. The elastic shim 42 and the spacer 43 help positional adjustment of the output shaft 9 relative to the carriers 13 and 14.

The two members (the elastic shim 42 and the spacer 43) are used for adjusting the position of the output shaft 9. Thus, it is possible to increase the variety of positional adjustment methods by combining these two members. Therefore, it is possible to more easily and accurately position the output shaft 9 relative to the carriers 13 and 14, and to reduce looseness of the output shaft 9.

In particular, the elastic shim 42 may be attached so as to be compressed and deformed slightly in the axial direction, such that the elastic restoring force produced in the elastic shim 42 can bias the first carrier 13 toward the second carrier 14. This securely prevents looseness of the carriers 13 and 14 and the output shaft 9. Even if the looseness of the output shaft 9 in the axial direction relative to the carriers 13 and 14 increases due to aged deterioration or the like, this looseness can be absorbed by the elastic shim 42. By biasing the first carrier 13 toward the second carrier 14, a preload can be applied to the bearings 15a and 15b disposed in the input shaft holes 13a and 14a of the carriers 13 and 14, respectively.

The speed reducing mechanisms 1A, 1B, and 1C as described above can be used for the joint portions 106a, 106b, and 106c, respectively, of the cooperative robot 100, such that the operation of the cooperative robot 100 can be stabilized. The speed reducing mechanisms 1A, 1B, and 1C as described above can be used for the joint portions 106a, 106b, and 106c, respectively, of the cooperative robot 100, such that the product life of the cooperative robot 100 can be extended.

In the above first embodiment, the elastic shim 42 and the spacer 43 are provided on the first end portion 9a of the output shaft 9. However, the configuration is not limited to this. The elastic shim 42 and the spacer 43 may be provided on the second end portion 9b of the output shaft 9. Further, it is also possible that the elastic shims 42 and the spacers 43 are provided on both end portions 9a and 9b of the output shaft 9. In addition, it is also possible that either one of the elastic shim 42 and the spacer 43 is provided.

In the first embodiment, the outer flange portion 4 is sandwiched between the second arm 112 and the ring portion 31 of the coupling member 30 to axially fix the case 2 fitted into the through hole 112d. The case 2 is fitted into the through hole 112d and the flat portions 2g of the anti-rotation portion are contacted with the flat portions 112g, so as to prevent the case 2 from rotating in the circumferential direction relative to the second arm 112. Therefore, when the speed reducing mechanism 1C is assembled to the second arm 112, to which the decelerated output of the speed reducing mechanism 1C is transmitted, there is no need to use bolts or other fasteners. Specifically, the assembly process can be completed by simply hooking the claw portion 33, which is a snap-fit structure, to the periphery of the second surface 112b. This reduces steps of the work process required for fastening by multiple bolts and eliminates work time. Since bolts and other fasteners are not used, there is no need to consider the strength of fastening when reducing the size or changing materials to resin for downsizing and weight reduction. Therefore, there is no need to form holes or other openings necessary for bolting in the outer flange portion 4 and the second arm 112. This can also reduce the steps of the work process.

In the first embodiment, the outer flange portion 4 is sandwiched between the second arm 112 and the coupling member 30 on both sides, so as to axially fix the case 2 fitted into the through hole 112d. The case 2 is fitted into the through hole 112d and the flat portions 2g of the anti-rotation portion are contacted with the flat portions 112g, so as to prevent the case 2 from rotating in the circumferential direction relative to the second arm 112. The anti-rotation capacity obtained by preventing the deformation of the anti-rotation portion can be higher than the anti-rotation capacity obtained by a frictional force produced by fastening with bolts. This enables larger torque transmission.

In the first embodiment, the coupling member 30 and the case 2 are separate components, but these members can be integrated. Specifically, the coupling member 30 with its holding surface 31a in contact with the first end surface 2c can be formed integrally with the case 2 without changing the shapes thereof. In other words, the elastic deformation portion 32 having the claw portion 33 at the distal end 32b may be formed integrally with the case 2. In this case, the outer flange portion 4 does not need to be held by the ring portion 31, and thus the proximal end 32a of the elastic deformation portion 32 can be positioned near the second end surface 4b of the outer flange portion 4 in the axial direction. In this case, it is preferable to mold the coupling member 30 and the case 2 with resin.

By the way, wave gears are sometimes preferred in precision apparatuses using small speed reducers, for the advantage of light weight. However, wave gears can cause ratcheting due to overloading or the like. Therefore, there is a need for a compact and lightweight eccentric oscillating speed reducer to replace the wave gears. If resin or other materials are used to reduce the size and weight of an eccentric oscillating speed reducer, the threaded portion, which is the connection with the mating member, may fail to have enough strength to withstand. In other words, in a rotation mechanism (including oscillating speed reducers) that uses resin, when bolts are used in the connection with the mating member to which the torque is transmitted, the threaded holes in the resin may fail to withstand the tightening strength of the bolts. This problem is solved in the present embodiment by using a snap-fit structure for the coupling member 30.

Torque is transmitted by means of circumferential irregularities that mesh with each other, as in the relationship between the flat portions 112g of the through hole 112d and the flat portions 2g of the outer periphery 2a of the case 2. This enables larger torque transmission than the friction between the surfaces using the axial tension of screws. Further, the snap-fit structure using the coupling member 30 allows easier mounting and dismounting of the case 2 than with bolts.

Even if the case 2 and the elastic deformation portion 32 are integrated, a resin-made member of the output portion that outputs rotation can be fastened to the mating member, by using a snap-fit structure as the coupling member 30 that deforms elastically.

Second Embodiment

Figure 5:
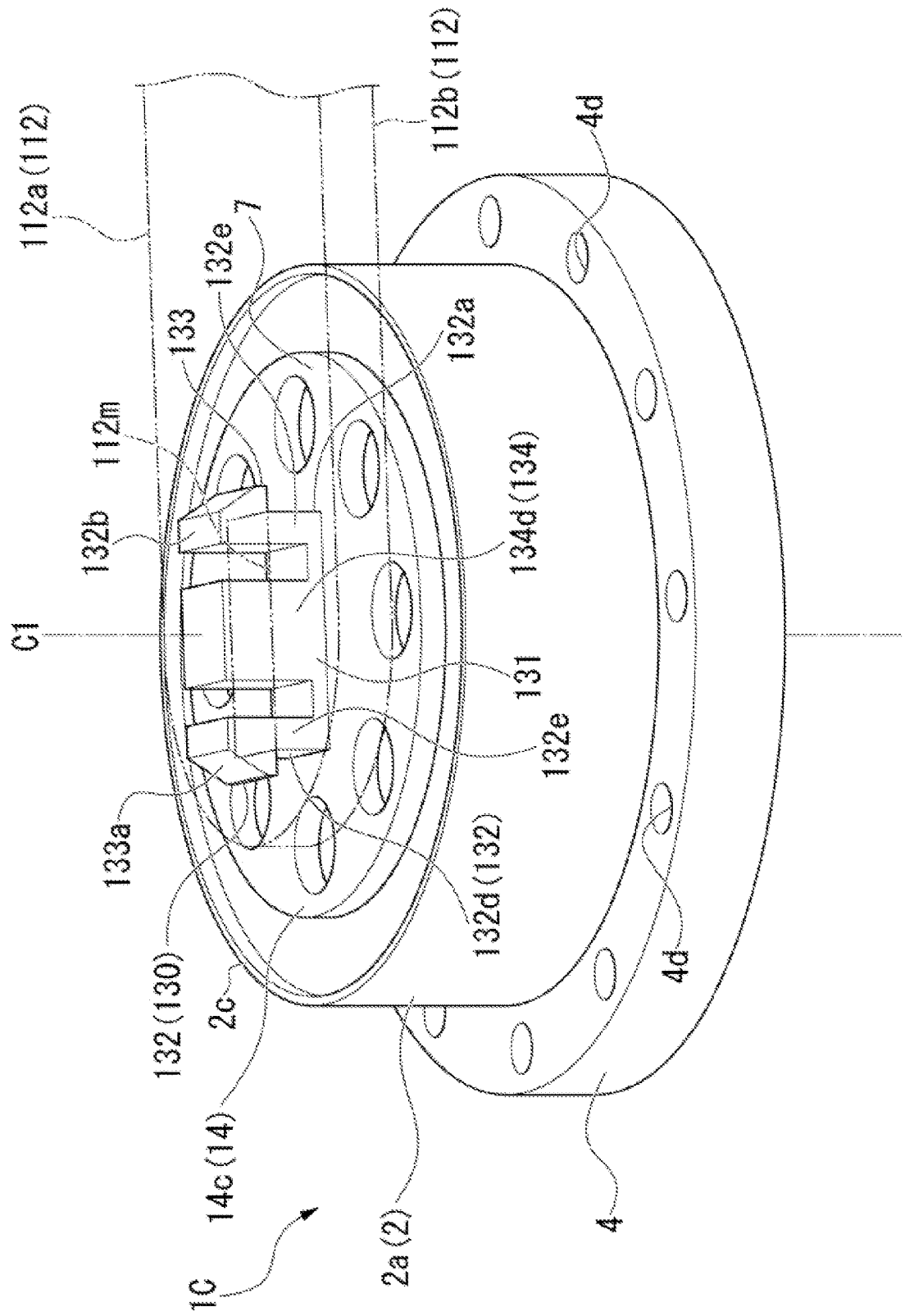
FIG. 5 is a schematic view showing a second embodiment of the rotation mechanism according to the disclosure.

The following describes a second embodiment of the rotation mechanism according to the disclosure with reference to the accompanying drawings. FIG. 5 is a perspective view showing the rotation mechanism according to the present embodiment. The second embodiment is different from the first embodiment in terms of the coupling portion and the output portion. Except for the coupling portion and the output portion, the same reference numerals are given to elements of the second embodiment corresponding to elements of the first embodiment, and the description of these elements will not be repeated.

As shown in FIG. 5, this embodiment includes the case 2 as the fixed portion and the carrier 7 as the output portion. In other words, the second arm (mating member) 112 is coupled to the carrier 7, and the first arm 111 is coupled to the case 2.

In the case 2 of this embodiment, the outer flange portion 4 is formed continuously over the entire circumference of the case 2. The outer flange portion 4 has a plurality of bolt holes 4d penetrating therethrough in the axial direction and arranged at equal intervals in the circumferential direction. The outer flange portion 4 receives the first arm 111 applied thereto from the outside in the axial direction (the opposite side to the second arm 112), which is the lower side in FIG. 5. Bolts are inserted into the bolt holes 4d from the opposite side to the first arm 111. The bolts are tightened to the internally threaded portions of the first arm 111, thereby fixing the case 2 to the first arm 111. The first arm 111 is not shown in FIG. 5.

The carrier 7 is formed integrally with a coupling member 130 as the coupling portion. The coupling member 130 is formed on the surface 14c of the second carrier 14. The coupling member 130 protrudes in the axial direction from the surface 14c of the second carrier 14. The coupling member 130 is formed near the center of the surface 14c of the second carrier 14 in the radial direction. The coupling member 130 includes a base 131 formed near the center of the surface 14c in the radial direction, two elastic deformation portions 132 extending in the axial direction from the base 131, a claw portion 133 formed at the distal end 132b of each of the two elastic deformation portions, and a central projection 134.

The base 131 is formed integrally with the second carrier 14. The base 131 projects in the axial direction from the surface 14c. The base 131 has a rectangular outline as viewed from the axial direction. The respective proximal ends 132a of the elastic deformation portions 132 are connected to the two opposed short sides of the four sides of the base 131. The proximal ends 132a are each formed as a plate positioned along the short side of the base 131. The distal ends 132b are each formed to be separated from the surface 14c in the axial direction. The elastic deformation portions 132 are formed such that the direction from the proximal ends 132a toward the distal ends 132b is perpendicular to the surface 14c.

The elastic deformation portions 132 are symmetrical to each other around the central axis C1. The elastic deformation portions 132 are parallel to each other. The elastic deformation portions 132 are formed along the lateral direction of the outline of the base 131. The elastic deformation portions 132 are spaced apart from each other in the radial direction along the longitudinal direction of the outline of the base 131. The central projection 134 is formed on a portion of the base 131 between the elastic deformation portions 132. The mutually opposed surfaces of the elastic deformation portions 132 are parallel to each other along the axial direction. At the distal ends 132b of the elastic deformation portions 132, there are formed the claw portions 133 projecting in the radial direction.

The claw portions 133 are formed on the elastic deformation portions 132 so as to project outward in the opposite radial directions. The claw portions 133 project outward from the outline of the base 131 as viewed along the axial direction. Each of the claw portions 133 is formed so that the amount of projection in the radially outward direction increases from the distal end 132b toward the proximal end 132a. In other words, the amount of projection of the claw portion 133 is largest at the position spaced by a predetermined distance from the distal end 132b toward the proximal end 132a. The claw portion 133 has a sloping surface 133a that is inclined to increase the thickness from the distal end 132b toward the proximal end 132a.

The outermost diameter between the elastic deformation portions 132, or the distance between the sloping surfaces 133a along the longitudinal direction of the outline of the base 131, increases from the distal ends 132b toward the proximal ends 132a along the sloping surfaces 133a. The distance between the contact surfaces 132d of the elastic deformation portions 132 along the longitudinal direction of the outline of the base 131 is constant over the range from the claw portions 133 to the proximal ends 132a.

Thus, the outermost diameter between the elastic deformation portions 132 corresponds to the distance between the sloping surfaces 133a along the longitudinal direction of the outline of the base 131. The elastic deformation portions 132 can be elastically deformed to the extent that the outermost diameter between the claw portions 133 changes. The elastic deformation portions 132 are hardly elastically deformed in a direction perpendicular to the projecting direction of the claw portions 133 along the surface 14c.

As viewed from the axial direction, the central projection 134 does not project outward beyond the outline of the base 131 (toward the surface 14c). As viewed from the axial direction, the central projection 134 extends over the entire lateral length of the outline of the base 131. The central projection 134 has the same length as one side of the outline of the base 131 in the lateral direction. The central projection 134 has a length in the longitudinal direction of the outline of the base 131 that is shorter than the distance between the proximal ends 132a of the elastic deformation portions 132. In other words, the central projection 134 is radially separated from each of the elastic deformation portions 132 in the longitudinal direction of the outline of the base 131.

The central projection 134 is hardly elastically deformable in the lateral direction of the outline of the base 131, which direction is perpendicular to the projecting direction of the claw portions 133 along the surface 14c. The side surfaces 134d of the central projection 134 are planes extending along the longitudinal direction of the outline of the base 131. The side surfaces 134d are spaced apart by a distance equal to the lateral length of the outline of the base 131.

The second arm 112 has a through hole (through portion) 112m extending through the second arm 112 in the thickness direction thereof. The through hole 112m corresponds to the through hole 112d in the first embodiment. The coupling member 130 is fitted in the through hole 112m. As viewed from the axial direction, the through hole 112m has approximately the same outline as the base 131 of the coupling member 130 fitted therein. In other words, as viewed from the axial direction, the through hole 112m has a rectangular outline and is open to the first surface 112a and the second surface 112b of the second arm 112. The outline of the opening in the first surface 112a and the outline of the opening in the second surface 112b of the second arm 112 are formed in the same shape and provided at the same position in the axial direction.

The inner periphery of the through hole 112m is in contact with the outer periphery of the base 131 of the coupling member 130 fitted in the through hole 112m. In the inner periphery of the through hole 112m, the entire periphery of the opening close to the second surface 112b is in contact with the outer periphery of the base 131. In particular, the inner periphery of the through hole 112m is in contact with the side surfaces 134d of the central projection 134 and the side surfaces 132e of the elastic deformation portions 132. Further, the inner periphery of the through hole 112m is in contact with the contact surfaces 132d of the elastic deformation portions 132.

After assembly, the coupling member 130 extends through the through hole 112m. The second surface 112b of the second arm 112 is in contact with the surface 14c of the second carrier 14. The second surface 112b of the second arm 112 is not in contact with the first end surface 2c of the case 2. The elastic deformation portions 132 extend in the axial direction from the second surface 112b of the second arm 112 beyond the first surface 112a of the second arm 112.

Anti-Rotation Portion

In this embodiment, the anti-rotation portion includes the contact surfaces 132d, the side surfaces 134d, and the side surface 132e of the coupling member 130. Also, the anti-rotation portion includes the through hole 112m of the second arm 112.

Assembling Operation and Action of Coupling Portion

When assembling the coupling member 130 and the second arm 112 to each other, the coupling member 130 and the second arm 112 are brought close to each other in the axial direction so that the second surface 112b remains perpendicular to the axial direction. At this time, the sides of the inner periphery of the through hole 112m along the lateral direction are aligned with the elastic deformation portions 132 as viewed from the axial direction, and the sides of the inner periphery of the through hole 112m along the longitudinal direction are aligned with the side surfaces 134d as viewed from the axial direction.

With this position maintained, the elastic deformation portions 132 are inserted into the through hole 112m of the second arm 112. The claw portions 133 abut against the inner surface of the through hole 112m, causing the elastic deformation portions 132 to elastically deform so as to bend inward in the longitudinal direction of the outline of the base 131. In other words, the projecting shape of the claw portions 133 causes the elastic deformation portions 132 to elastically deform in the directions in which the distal ends 132b move closer to each other.

When the elastic deformation portions 132 are inserted into the through hole 112m, the claw portions 133 pass through the through hole 112m and reach the outside of the through hole 112m in the axial direction, beyond the first surface 112a of the second arm 112. Thus, the claw portions 133 no longer abut against the inner surface of the through hole 112m, causing the elastic restorative deformation of the elastic deformation portions 132 in which the elastic deformation portions 132 straighten outward in the longitudinal direction of the outline of the base 131 to return to the positions taken before the insertion. The inner surface of the through hole 112m contacts with the contact surfaces 132d of the elastic deformation portions 132 adjacent to the claw portions 133. At the same time, the second surface 112b of the second arm 112 contacts with the surface 14c of the second carrier 14. The contact area between the second surface 112b of the second arm 112 and the surface 14c of the second carrier 14 is as large as possible. This arrangement sets and defines the direction of fixation of the second arm 112 to the second carrier 14.

As a result, the elastic deformation portions 132 are fixed to the through hole 112m by the snap-fit structure using the elastic restorative deformation of the elastic deformation portions 132. On the first surface 112a of the second arm 112, the claw portions 133 abut against the periphery of the through hole 112m. This allows the coupling member 130 to be retained to the second arm 112. In other words, the second arm 112 and the second carrier 14 can be retained to each other.

Further, the side surfaces 134d of the central projection 134 and the side surfaces 132e of the elastic deformation portions 132 contact with the inner surface of the through hole 112m in the lateral direction of the outline of the base 131. Further, the contact surfaces 132d of the elastic deformation portions 132 contact with the inner surface of the through hole 112m in the longitudinal direction of the outline of the base 131.

In the axial direction along the central axis C1, all the contactable surfaces of the outer periphery of the coupling member 130, including the outline of the base 131, positioned on the second surface 112b side of the claw portions 133 and the first surface 112a of the second arm 112 are in contact with the inner surface of the through hole 112m. In other words, all the contactable surfaces of the outer periphery of the coupling member 130 are in contact with the inner surface of the through hole 112m for the entire length in the thickness direction of the second arm 112. This prevents the rotation between the second arm 112 and the carrier 14 by the action of the anti-rotation portion.

In the second embodiment, the carrier 7 and the coupling member 130 are formed of resin, and at the same time, the carrier 7 and the coupling member 130 are integrated. This produces the effect of providing a rotation mechanism and a robot that can have a small size and weight using resin and have an improved assembly and disassembly work efficiency. At the same time, since the case 2 does not have to be made of resin, it does not lack the necessary strength for bolting or the like.

Third Embodiment

Figure 6:
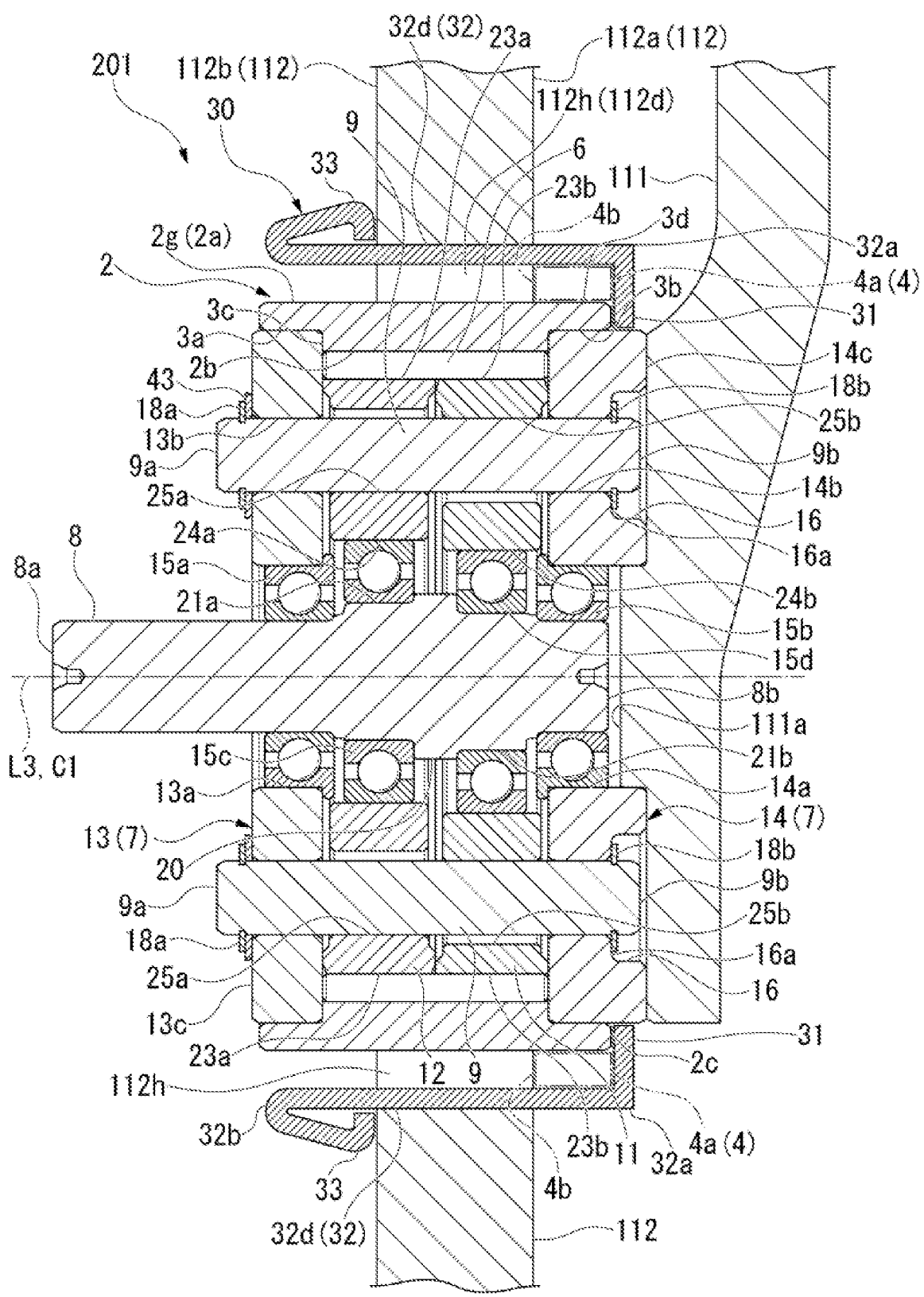
FIG. 6 is a schematic view showing a third embodiment of the rotation mechanism according to the disclosure.

The following describes a speed reducing mechanism according to a third embodiment of the disclosure with reference to the accompanying drawings. FIG. 6 schematically illustrates a speed reducing mechanism 201 according to the third embodiment. The third embodiment is different from the first and second embodiments in terms of the elastic shim. Except for the elastic shim, the same reference numerals are given to elements of the third embodiment corresponding to elements of the first and second embodiments, and the description of these elements will not be repeated.

The difference between the third embodiment and the first and second embodiments is that the elastic shim 42 is provided on the first end portion 9a side of the output shaft 9 in the first embodiment, whereas the elastic shim 42 is not provided in the third embodiment. As shown in FIG. 6, the shim receiving recess 41 (see FIG. 2) is not formed in the surface 13c of the first carrier 13. Therefore, the entire surface 13c of the first carrier 13 is flat. Only the spacer 43 is provided on the first end portion 9a of the output shaft 9. The speed reducing mechanism 201 thus configured also produces the same effect as in the first embodiment.

Fourth Embodiment

Figure 7:
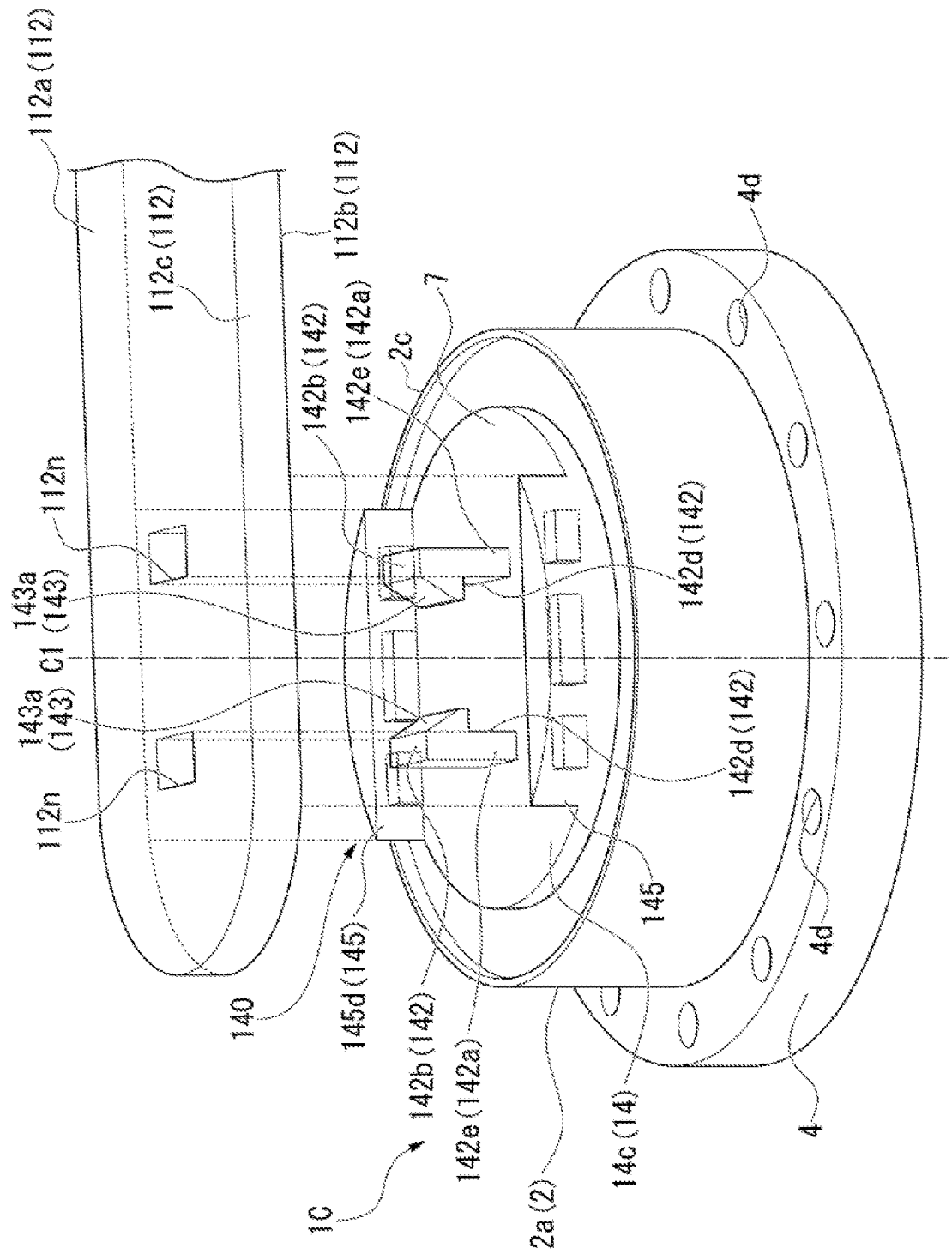
FIG. 7 is a schematic view showing a fourth embodiment of the rotation mechanism according to the disclosure.

The following describes a fourth embodiment of the rotation mechanism according to the disclosure with reference to the accompanying drawings. FIG. 7 is an exploded perspective view showing the rotation mechanism according to the fourth embodiment. The fourth embodiment is different from the above-described second embodiment in terms of the coupling portion and the output portion. Except for the coupling portion and the output portion, the same reference numerals are given to elements of the fourth embodiment corresponding to elements of the second embodiment, and the description of these elements will not be repeated.

As shown in FIG. 7, this embodiment includes the case 2 as the fixed portion and the carrier 7 as the output portion. In other words, the second arm (mating member) 112 is coupled to the carrier 7, and the first arm 111 is coupled to the case 2.

In the case 2 of this embodiment, the outer flange portion 4 is formed continuously over the entire circumference of the case 2. The outer flange portion 4 has a plurality of bolt holes 4d penetrating therethrough in the axial direction and arranged at equal intervals in the circumferential direction. The outer flange portion 4 receives the first arm 111 applied thereto from the outside in the axial direction (the opposite side to the second arm 112), which is the lower side in FIG. 7. Bolts are inserted into the bolt holes 4d from the side of the outer flange portion 4 opposite to the first arm 111. The bolts are tightened to the internally threaded portions of the first arm 111, thereby fixing the case 2 to the first arm 111. The first arm 111 is not shown in FIG. 7.

The carrier 7 is formed integrally with a coupling member 140 as the coupling portion. The coupling member 140 is formed on the surface 14c of the second carrier 14. The coupling member 140 protrudes in the axial direction from the surface 14c of the second carrier 14. The coupling member 140 is formed near the center of the surface 14c of the second carrier 14 in the radial direction. Unlike the coupling member 130 of the second embodiment, the coupling member 140 does not include a base 131 (see FIG. 5) formed near the center of the surface 14c in the radial direction. The coupling member 140 includes two elastic deformation portions 142 extending in the axial direction from the surface 14c of the second carrier 14, claw portions 143 formed at the distal ends 142b of the two elastic deformation portions, and two projections 145 provided on the surface 14c of the carrier 14 and positioned outside the second arm (mating member) 112.

As with the elastic deformation portions 132 in the second embodiment, the elastic deformation portions 142 are formed integrally with the second carrier 14. As with the elastic deformation portions 132 in the second embodiment, the elastic deformation portions 142 project from the surface 14c in the axial direction. The elastic deformation portions 142 are provided at the same positions as the elastic deformation portions 132 in the second embodiment, as viewed from the axial direction. The proximal ends 142a of the elastic deformation portions 142 are shaped like a plate and connected to the surface 14c of the second carrier 14. The distal ends 142b of the elastic deformation portions 142 are separated from the surface 14c in the axial direction. The elastic deformation portions 142 are formed such that the direction from the proximal ends 142a toward the distal ends 142b is perpendicular to the surface 14c.

The elastic deformation portions 142 are symmetrical to each other around the central axis C1. The elastic deformation portions 142 are parallel to each other. The elastic deformation portions 142 are formed in the same manner as the elastic deformation portions 132. The proximal ends 142a of the elastic deformation portions 142 are formed to be planes parallel to each other. At the distal ends 142b of the elastic deformation portions 142, there are formed claw portions 143 projecting in the radial directions so as to be opposed to each other.

The claw portions 143 are formed so as to project radially inward. In the second embodiment, as viewed from the axial direction, the claw portions 133 project outside of the outline of the base 131 from the elastic deformation portions 132 extending along the lateral direction of the outline of the base 131. In this respect, the claw portions 143 of the present embodiment are different.

Each of the claw portions 143 is formed so that the amount of projection in the radially inward direction increases from the distal end 142b toward the proximal end 142a. In other words, the amount of projection of the claw portion 143 is largest at the position spaced by a predetermined distance from the distal end 142b toward the proximal end 142a. The claw portion 143 has a sloping surface 143a that is inclined to increase the thickness from the distal end 142b toward the proximal end 142a.

The distance between the elastic deformation portions 142 decreases along the sloping surfaces 143a from the distal ends 142b toward the proximal ends 142a. Further, the distance between the elastic deformation portions 142 is constant beyond the claw portions 143 to the proximal ends 142a. The contact surfaces 142e positioned perpendicular to the direction in which the claw portions 143 of the elastic deformation portions 142 are opposed are flush with each other.

The distance between the elastic deformation portions 142 is the distance between the sloping surfaces 143a in the radial direction and the distance between the contact surfaces 142d in the radial direction. The elastic deformation portions 142 can be elastically deformed to the extent that the distance between the claw portions 143 changes. The elastic deformation portions 142 are hardly elastically deformable in a direction perpendicular to the projecting direction of the claw portions 143 along the surface 14c.

The projections 145 are formed on both sides of the second arm (mating member) 112, as viewed from the axial direction. The projections 145 are opposed to the contact surfaces 142e, as viewed from the axial direction. The projections 145 extend longer than and in the same direction as the distance between the elastic deformation portions 142, as viewed from the axial direction. The projections 145 project from the surface 14c in the same direction as the elastic deformation portions 142.

The projections 145 has a surface facing radially outward that is shaped like an arc having the same outline as the surface 14c of the second carrier 14. The projections 145 has a surface facing radially inward that is contacted by the side surfaces 112c of the second arm (mating member) 112. The projections 145 are spaced apart from the two elastic deformation portions in the radial direction, as viewed from the axial direction.

The projections 145 are hardly elastically deformable in a direction perpendicular to the projecting direction of the claw portions 143 along the surface 14c. The side surfaces 145d of the projections 145 have a planar shape extending along the longitudinal side surfaces 112c of the second arm (mating member) 112 and in parallel to the contact surfaces 142e.

The second arm 112 has two through holes (through portions) 112n extending through the second arm 112 in the thickness direction thereof. The through holes 112n correspond to the through hole 112m in the second embodiment. As viewed from the axial direction, the two through holes 112n are spaced apart in the projecting direction of the claw portions 143 (radial direction). Each of the through holes 112n has a rectangular outline, as viewed from the axial direction. Each of the through holes 112n is open to the first surface 112a and the second surface 112b of the second arm 112. The opening outline of the through holes 112n open to the first surface 112a and the opening outline of the through holes 112n open to the second surface 112b are formed in the same shape as viewed from the axial direction and are provided at the same position in the axial direction.

The through holes 112n receive the corresponding elastic deformation portions 142 fitted therein. As viewed from the axial direction, the through holes 112n have an outline that is slightly larger than the outline of the elastic deformation portions 142 fitted therein. As viewed from the axial direction, the through holes 112n have an outline with approximately the same dimension as the outline of the elastic deformation portions 142 fitted therein, in a direction perpendicular to the projecting direction of the claw portions 143. As viewed from the axial direction, the through holes 112n have an outline that is in contact with the contact surfaces 142e.

As viewed from the axial direction, the through holes 112n have an outline larger than the opposed proximal ends 142a of the elastic deformation portions 142 fitted therein, in the direction opposite to the projecting direction of the claw portions 143. As viewed from the axial direction, the through holes 112n have an outline that is approximately the same as the outline of the proximal ends 142a of the elastic deformation portions 142 fitted therein, in the projecting direction of the claw portions 143.

In other words, the distance between the inner peripheries of the through holes 112n is the same as the distance between the contact surfaces 142d of the opposed proximal ends 142a of the elastic deformation portions 142, in the projecting direction of the claw portions 143. The distance between the inner peripheries of the through holes 112n on the side opposite to the projecting direction of the claw portions 143 is larger than the distance between the outer surfaces of the distal ends 142b of the elastic deformation portions 142.

The inner peripheries of the through holes 112n are in contact with the contact surfaces 142d and the contact surfaces 142e of the elastic deformation portions 142 of the coupling member 140 fitted in the through holes 112n. In the inner peripheries of the through holes 112n, the peripheries of the openings close to the second surface 112b are in contact with the contact surfaces 142d.

The elastic deformation portions 142 penetrate through the corresponding through holes 112n. At this time, the second surface 112b of the second arm 112 contacts with the surface 14c of the carrier 14. The second surface 112b of the second arm 112 is not in contact with the first end surface 2c of the case 2. The elastic deformation portions 142 extend in the axial direction from the second surface 112b of the second arm 112 beyond the first surface 112a of the second arm 112.

Both side surfaces 112c of the second arm (mating member) 112 are in contact with the entire length of the side surfaces 145d of the projections 145. The side surfaces 145d of the two projections 145 are in contact with both side surfaces 112c of the second arm 112. Thus, when the coupling member 140 is assembled, the second arm 112 is sandwiched between the two projections 145.

Anti-Rotation Portion

In this embodiment, the anti-rotation portion includes the contact surfaces 142d and the contact surfaces 142e of the elastic deformation portions 142 and the side surfaces 145d of the projections 145. Also, the anti-rotation portion includes the through holes 112n and the both side surfaces 112c of the second arm 112.

Assembling Operation and Action of Coupling Portion

When assembling the coupling member 140 and the second arm 112 to each other, the coupling member 140 and the second arm 112 are brought close to each other in the axial direction so that the second surface 112b remains perpendicular to the axial direction. At this time, the two through holes 112n are aligned with the elastic deformation portions 142 as viewed from the axial direction, and the both side surfaces 112c of the second arm 112 are aligned with the side surfaces 145d of the projections 145 as viewed from the axial direction. In FIG. 7, the dotted lines indicate the direction in which the coupling member 140 and the second arm 112 are brought close to each other for assembly.

With this position maintained, the elastic deformation portions 142 are inserted into the through holes 112n of the second arm 112. The claw portions 143 then abuts against the inner surfaces of the two through holes 112n. Thus, the elastic deformation portions 142 are elastically deformed so that the distal ends 142b move away from each other with the proximal ends 142a serving as the base points. In other words, the projecting shape of the claw portions 143 causes the elastic deformation portions 142 to elastically deform in the directions in which the distal ends 142b move away from each other. At this time, the through holes 112n of the second arm 112 contacts with the contact surfaces 142e.

When the elastic deformation portions 142 are further inserted into the through holes 112n, the claw portions 143 pass through the through holes 112n and reach the outside beyond the first surface 112a of the second arm 112. The claw portions 143 then no longer abut against the inner surfaces of the through holes 112n. Accordingly, the elastic deformation portions 142 undergo the elastic restorative deformation in which the distal ends 142b move closer to each other with the proximal ends 142a serving as the base points, so as to return to the positions taken before the insertion. The inner surfaces of the through holes 112n contact with the contact surfaces 142d of the elastic deformation portions 142 adjacent to the claw portions 143.

Simultaneously, the both side surfaces 112c of the second arm 112 contact with the side surfaces 145d of the projections 145. Further, the second surface 112b of the second arm 112 contacts with the surface 14c of the second carrier 14. The contact area between the second surface 112b of the second arm 112 and the surface 14c of the carrier 14 is as large as possible. This arrangement sets and defines the direction of fixation of the second arm 112 to the carrier 14.

As a result, the elastic deformation portions 142 are fixed to the through holes 112n by the snap-fit structure using the elasticity of the elastic deformation portions 142. Simultaneously, the both side surfaces 112c of the second arm 112 are fixed to the side surfaces 145d of the projections 145. On the first surface 112a of the second arm 112, the claw portions 143 abut against the peripheries of the through holes 112n. This allows the coupling member 140 to be retained to the second arm 112. In other words, the second arm 112 and the carrier 14 can be retained to each other. The both side surfaces 112c of the second arm 112 contact with the side surfaces 145d of the projections 145, and the contact surfaces 142e of the elastic deformation portions 142 contact with the inner surfaces of the through holes 112n. In the direction perpendicular to the contact surfaces 142e, the contact surfaces 142d of the elastic deformation portions 142 are in contact with the opposed inner surfaces of the through holes 112n.

As viewed from the axial direction along the central axis C1, the second arm 112 is sandwiched between the elastic deformation portions 142 and the projections 145 of the coupling member 140. All the contactable surfaces of the coupling member 140 and the projection 145 are in contact with the second arm 112. Specifically, all the contactable surfaces of the coupling member 140 and the projections 145 are in contact with the through holes 112n and the both side surfaces 112c for the entire length in the thickness direction of the second arm 112. This prevents the rotation between the second arm 112 and the carrier 14 by the action of the anti-rotation portion.

In the embodiment, the carrier 7, the coupling member 140, and the projections 145 are formed of resin, and at the same time, the carrier 7, the coupling member 140, and the projections 145 are integrated. This produces the effect of providing a rotation mechanism and a robot that can have a small size and weight using resin and have an improved assembly and disassembly work efficiency. At the same time, since the case 2 does not have to be made of resin, it does not lack the necessary strength for bolting or the like. This embodiment produces the same advantageous effects as the second embodiment described above.

Furthermore, in this embodiment, the action of the anti-rotation portion is received only by the projections 145, and the fixation between the carrier 7 and the coupling member 140 in the axial direction is accomplished by the snap-fit structure. This arrangement makes it possible to present a more secure action of the anti-rotation portion. Further, the projections 145 can be divided into multiple portions, as indicated by the double-dotted line in FIG. 7. In this case, the plurality of projections 145 may all be formed along the both side surfaces 112c.

The present disclosure is not limited to the above embodiments but encompasses various modifications of the above embodiments not departing from the purport of the present disclosure. For example, in the coupling member 130 of the second embodiment, the claw portions 133 are configured to project in opposite directions, but they may also be formed inwardly to face each other. In addition, an anti-rotation portion is formed, in which the central projection 134 inside the through hole 112m is positioned and prevented from rotating relative to the carrier 14 of the second arm 112, using the side surfaces 134d and the like. It is also possible that an axial projection for preventing rotation is formed on the surface 14c of the carrier 14 at positions on both sides of the second arm 112 in the lateral direction of the outline of the base 131.

For example, in the above-described embodiments, the speed reducing mechanisms 1A to 1C are used in the cooperative robot 100 as a robot. However, this configuration is not limitative. The configurations of the above-described embodiments can be applied to various robots including, for example, two members (first member and second member) and a speed reducing mechanisms 1A to 1C disposed between the two members, the second member rotating relative to the first member.

In the above embodiments, the speed reducing mechanisms 1A to 1C have been described as an example of the gear mechanism. However, the gear mechanism is not limited to these. The configuration of the above-described embodiments can be applied to various gear mechanisms other than the speed reducing mechanisms 1A to 1C in which, for example, two gears are meshed with each other, and the rotational force is transmitted to one of the two gears, or the rotational force of this gear is transmitted to a shaft.

In the above-described embodiments, the speed reducing mechanisms 1A to 1C are what is called eccentric oscillating speed reducing mechanisms, and each speed reducing mechanism has a single center crankshaft (input crankshaft 8) coaxial with the central axis C1 of the case 2. However, the embodiments are not limited to this. For example, the eccentric oscillating speed reducing mechanism may be configured to oscillatorily rotate the oscillating gears 11 and 12 by rotation of two or more input crankshafts 8 in conjunction with each other. In this case, the input crankshafts 8 rotate while they revolve around the center axis C1 at the same time.

In the embodiments described above, the cooperative robot 100 uses the servomotors 107, 108, and 109 as drive sources. However, the drive sources are not limited to these. For example, various drive sources such as other electric motors, hydraulic motors, engines or the like may be used in place of the servomotors.

In the above embodiments, the carriers 13 and 14 are made of resin, for example. However, the carriers 13 and 14 may be made of other materials capable of reducing the size and weight.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A rotation mechanism, comprising:
    a case configured to output rotation to a mating member, from a drive source, which is producing a rotational force around an axis;
    a coupling member configured to couple the mating member and the case by elastic deformation; and
    an anti-rotation portion configured to prevent relative rotation between the mating member and the case,
    wherein an outer flange portion projecting outward in a radial direction of the case is formed on the outer periphery of the case,
    wherein the case is fitted into a through hole formed to pass through the mating member in an axial direction along the axis, with the outer flange portion in contact with a first surface of the mating member,
    wherein the coupling member includes:
        a ring portion contacting with the outer flange portion;
        an elastic deformation portion extending in the axial direction from the ring portion across a second surface of the mating member, and capable of elastic deformation in a radial direction intersecting the axial direction; and
        a claw portion provided at a distal end of the elastic deformation portion and projecting in the radial direction,
    wherein the coupling member couples the case fitted into the through hole in the axial direction by pressing the outer flange portion against the mating member with the ring portion,
    wherein, in a state in which the coupling member couples the case and the mating member, the elastic deformation portion extends through the through portion in the axial direction and the elastic deformation portion is in contact with an inner surface of the through portion, and the claw portion contacts against a periphery of the through hole, on the second surface of the mating member, and wherein the case is prevented from rotating relative to through hole in a circumferential direction around the axis by the anti-rotation portion.

2. The rotation mechanism of claim 1, wherein the coupling member and the case are integrally formed of resin.

3. The rotation mechanism of claim 2, wherein the coupling member is a snap-fit structure.

4. The rotation mechanism of claim 1, comprising:
at least one crankshaft provided in the case and configured to rotate by receiving the rotation of the drive source; and
a carrier provided in the case and configured to decelerate rotation of the crankshaft,
wherein the carrier is configured to be fixed to a stationary member.

5. The rotation mechanism of claim 1, comprising:
at least one crankshaft provided in the case and configured to rotate by receiving the rotation of the drive source; and
a carrier provided in the case and configured to decelerate rotation of the crankshaft,
wherein the carrier is configured to be fixed to a stationary member,
wherein the outer periphery of the case is in contact with the inner surface of the through hole, and
wherein the anti-rotation portion is provided between the outer periphery of the case and the inner surface of the through hole.

6. The rotation mechanism of claim 5,
wherein an outer diameter of the case decreases in an axial direction along the axis toward a direction in which the outer periphery of the case is fitted into the through hole, and
wherein an inner diameter of the through hole decreases toward the direction in which the outer periphery of the case is fitted into the through hole.

7. The rotation mechanism of claim 1, comprising:
a case fixed to a stationary member;
at least one crankshaft provided in the case and configured to rotate by receiving the rotation of the drive source; and
a carrier provided in the case and configured to decelerate rotation of the crankshaft and output the decelerated rotation to the mating member,
wherein the carrier serves as the output portion, and
wherein the coupling member is formed integrally with the carrier.

8. The rotation mechanism of claim 1, comprising:
an internal gear provided in the case and having internal teeth;
an oscillating gear having external teeth meshing with the internal teeth, the oscillating gear being configured to rotate oscillatorily;
a crankshaft having an eccentric portion that rotatably supports the oscillating gear and configured to transmit a rotational force of a drive source around an axis to the oscillating gear; and
a carrier configured to receive the rotational force from the oscillating gear,
wherein the coupling member formed of resin
wherein the carrier is configured to be fixed to a stationary member,
wherein the outer periphery of the case is in contact with the inner surface of the through hole, and
wherein the anti-rotation portion is provided between the outer periphery of the case and the inner surface of the through hole.

9. A rotation mechanism, comprising:
a case;
an internal gear provided in the case and having internal teeth;
an oscillating gear having external teeth meshing with the internal teeth, the oscillating gear being configured to rotate oscillatorily;
a crankshaft having an eccentric portion that rotatably supports the oscillating gear and configured to transmit a rotational force of a drive source around an axis to the oscillating gear;
a carrier configured to receive the rotational force from the oscillating gear and serve as an output portion for output to a mating member;
a coupling member for coupling the mating member and the output portion by elastic deformation; and
an anti-rotation portion for preventing relative rotation between the mating member and the output portion,
wherein the coupling member and the output portion are integrally formed of resin,
wherein the coupling member includes:
an elastic deformation portion extending in an axial direction along the axis and capable of elastic deformation in a radial direction intersecting the axial direction; and
a claw portion provided at a distal end of the elastic deformation portion and projecting in the radial direction, and
wherein, in a state in which the coupling member couples the output portion and the mating member, the elastic deformation portion extends through a through portion formed in the mating member and extending along the axial direction, and the elastic deformation portion is in contact with an inner surface of the through portion.

10. A robot, comprising:
a first member and a second member; and
a rotation mechanism provided between the first member and the second member and configured to rotate the second member relative to the first member,
wherein the rotation mechanism includes:
a case is-configured to output rotation to the second member, from a drive source, which is producing a rotational force around an axis;
a coupling member configured to couple the second member and the case by elastic deformation; and
an anti-rotation portion configured to prevent relative rotation between the second member and the output portion case,
wherein an outer flange portion projecting outward in a radial direction of the case is formed on the outer periphery of the case,
wherein the case is fitted into a through hole formed to pass through the second member in an axial direction along the axis, with the outer flange portion in contact with a first surface of the second member,
wherein the coupling member includes:
a ring portion contacting with the outer flange portion;
an elastic deformation portion extending in the axial direction from the ring portion across a second surface of the second member, and capable of elastic deformation in a radial direction intersecting the axial direction; and a claw portion provided at a distal end of the elastic deformation portion and projecting in the radial direction, wherein the coupling member couples the case fitted into the through hole in the axial direction by pressing the outer flange portion against the second member with the ring portion, wherein, in a state in which the coupling member couples the case and the second member, the elastic deformation portion extends through the through portion in the axial direction and the elastic deformation portion is in contact with an inner surface of the through portion, and the claw portion contacts against a periphery of the through hole, on the second surface of the second member, and wherein the case is prevented from rotating relative to through hole in a circumferential direction around the axis by the anti-rotation portion.

* * * * *